US010582235B2

(12) United States Patent
Jakkula et al.

(10) Patent No.: US 10,582,235 B2
(45) Date of Patent: Mar. 3, 2020

(54) METHODS AND APPARATUS TO MONITOR A MEDIA PRESENTATION

(71) Applicant: The Nielsen Company (US), LLC, New York, NY (US)

(72) Inventors: Gangadhar Jakkula, Tampa, FL (US); Narasimha Reddy Goli, Hyderabad (IN)

(73) Assignee: The Nielsen Company (US), LLC, New York, NY (US)

( * ) Notice: Subject to any disclaimer, the term of this patent is extended or adjusted under 35 U.S.C. 154(b) by 187 days.

(21) Appl. No.: 15/253,448

(22) Filed: Aug. 31, 2016

(65) Prior Publication Data

US 2017/0064351 A1 Mar. 2, 2017

(30) Foreign Application Priority Data

Sep. 1, 2015 (IN) .......................... 2733/DEL/2015

(51) Int. Cl.
*H04N 21/24* (2011.01)
*H04N 21/8547* (2011.01)
*H04N 21/442* (2011.01)
*H04N 21/262* (2011.01)
*H04N 21/84* (2011.01)
*H04N 21/458* (2011.01)

(52) U.S. Cl.
CPC ... *H04N 21/2402* (2013.01); *H04N 21/26208* (2013.01); *H04N 21/44209* (2013.01); *H04N 21/44213* (2013.01); *H04N 21/4583* (2013.01); *H04N 21/84* (2013.01); *H04N 21/8547* (2013.01)

(58) Field of Classification Search
CPC ....... H04N 21/2343; H04N 21/234345; H04N 21/23608; H04N 21/2402; H04N 21/26208; H04N 21/44209; H04N 21/44213; H04N 21/4583; H04N 21/84; H04N 21/8547
USPC .............................................. 725/9, 19, 133
See application file for complete search history.

(56) References Cited

U.S. PATENT DOCUMENTS

| 7,937,382 B2 * | 5/2011 | Soldan ............. G06F 17/30029 707/705 |
| 8,006,258 B2 | 8/2011 | Ramaswamy |
| 9,071,868 B2 | 6/2015 | Neumeier |
| 9,292,894 B2 | 3/2016 | Macintosh |
| 9,693,117 B2 | 6/2017 | McMillan |
| 2004/0045036 A1 * | 3/2004 | Terasaki ............. H04N 7/17318 725/116 |

(Continued)

*Primary Examiner* — James R Sheleheda
*Assistant Examiner* — Franklin S Andramuno
(74) *Attorney, Agent, or Firm* — Hanley, Flight & Zimmerman, LLC

(57) ABSTRACT

Methods, apparatus, systems and articles of manufacture to monitor a media presentation are disclosed. An example method includes in response to receipt of a media identifier, extracting, by executing an instruction with a processor, a timestamp from the received media identifier. A time of receipt of the media identifier is determined. A difference between the time of receipt of the media identifier and the timestamp from the received media identifier is determined. A time shifted viewing code is calculated based on the difference. The time shifted viewing code is transmitted to a media monitor that transmitted the media identifier, the time shifted viewing code to be reported when the media monitor reports monitoring information.

33 Claims, 19 Drawing Sheets

(56) References Cited

U.S. PATENT DOCUMENTS

| | | | |
|---|---|---|---|
| 2007/0050832 A1 | 3/2007 | Wright | |
| 2008/0148309 A1* | 6/2008 | Wilcox | H04H 60/22 |
| | | | 725/14 |
| 2009/0245759 A1* | 10/2009 | Okuyama | H04N 5/76 |
| | | | 386/291 |
| 2010/0153982 A1* | 6/2010 | Ramaswamy | H04H 60/40 |
| | | | 725/9 |
| 2011/0131596 A1* | 6/2011 | Amsterdam | H04H 60/33 |
| | | | 725/14 |
| 2013/0283173 A1* | 10/2013 | Harper | G06Q 30/02 |
| | | | 715/734 |
| 2014/0074855 A1 | 3/2014 | Zhao | |
| 2014/0233923 A1* | 8/2014 | Bradley | H04N 21/25891 |
| | | | 386/298 |
| 2015/0296269 A1* | 10/2015 | Tokumo | H04N 21/238 |
| | | | 725/93 |

\* cited by examiner

| MEDIA ID | SEGMENT CODE | ORIGINATOR | PROGRAM | TELECAST | STREAM |
|---|---|---|---|---|---|
| FD_7896854 | 2_00_00_D1_11111 | CBS | BIG BANG THEORY | S2 E2 | LIVE |
| PC_VULW | 2_00_00_D22_11111 | ABC | MODERN FAMILY | S4 E2 | LIVE + 3 |
| FD_SJDFD | 2_00_01_D5_11111 | ABC | MODERN FAMILY | S4 E2 | LIVE + 3 |
| FD_ZJHSGF | 2_00_01_D65_11111 | ABC | MODERN FAMILY | S4 E2 | LIVE + 3 |

FIG. 14

METHODS AND APPARATUS TO MONITOR A MEDIA PRESENTATION

RELATED APPLICATION

This patent claims priority to Indian provisional patent application no. 2733/DEL/2015, which was filed on Sep. 1, 2015, and was entitled "METHODS AND APPARATUS TO MONITOR A MEDIA PRESENTATION". Indian provisional patent application no. 2733/DEL/2015 is hereby incorporated herein by reference in its entirety.

FIELD OF THE DISCLOSURE

This disclosure relates generally to measuring media exposure, and, more particularly, to methods and apparatus to monitor a media presentation.

BACKGROUND

In recent years, media devices have been provided with Internet connectivity and the ability to retrieve media from the Internet. As such, media exposure has shifted away from conventional methods of presentation, such as broadcast television, towards presentation via consumer devices accessing media via the Internet.

Media providers and/or other entities such as, for example, advertising companies, broadcast networks, etc. are often interested in the viewing, listening, and/or media behavior of audience members and/or the public in general. The media usage and/or exposure habits of monitored audience members, as well as demographic data about the audience members, are collected and used to statistically determine the size and demographics of an audience of interest.

Traditionally, audience measurement entities determine audience engagement levels for media programming and/or advertisements based on registered panel members. That is, an audience measurement entity enrolls people who consent to being monitored into a panel. The audience measurement entity then monitors those panel members to collect media measurement data identifying media (e.g., television programs, radio programs, movies, DVDs, etc.) presented to those panel members. In this manner, the audience measurement entity can determine exposure measures for different media (e.g., content and/or advertisements) based on the collected media measurement data.

BRIEF DESCRIPTION OF THE DRAWINGS

FIG. 14 is an example data table representing an example control file that may be sent from the central facility to the database proprietor.

The figures are not to scale. Wherever possible, the same reference numbers will be used throughout the drawing(s) and accompanying written description to refer to the same or like parts.

DETAILED DESCRIPTION

Figure 1:
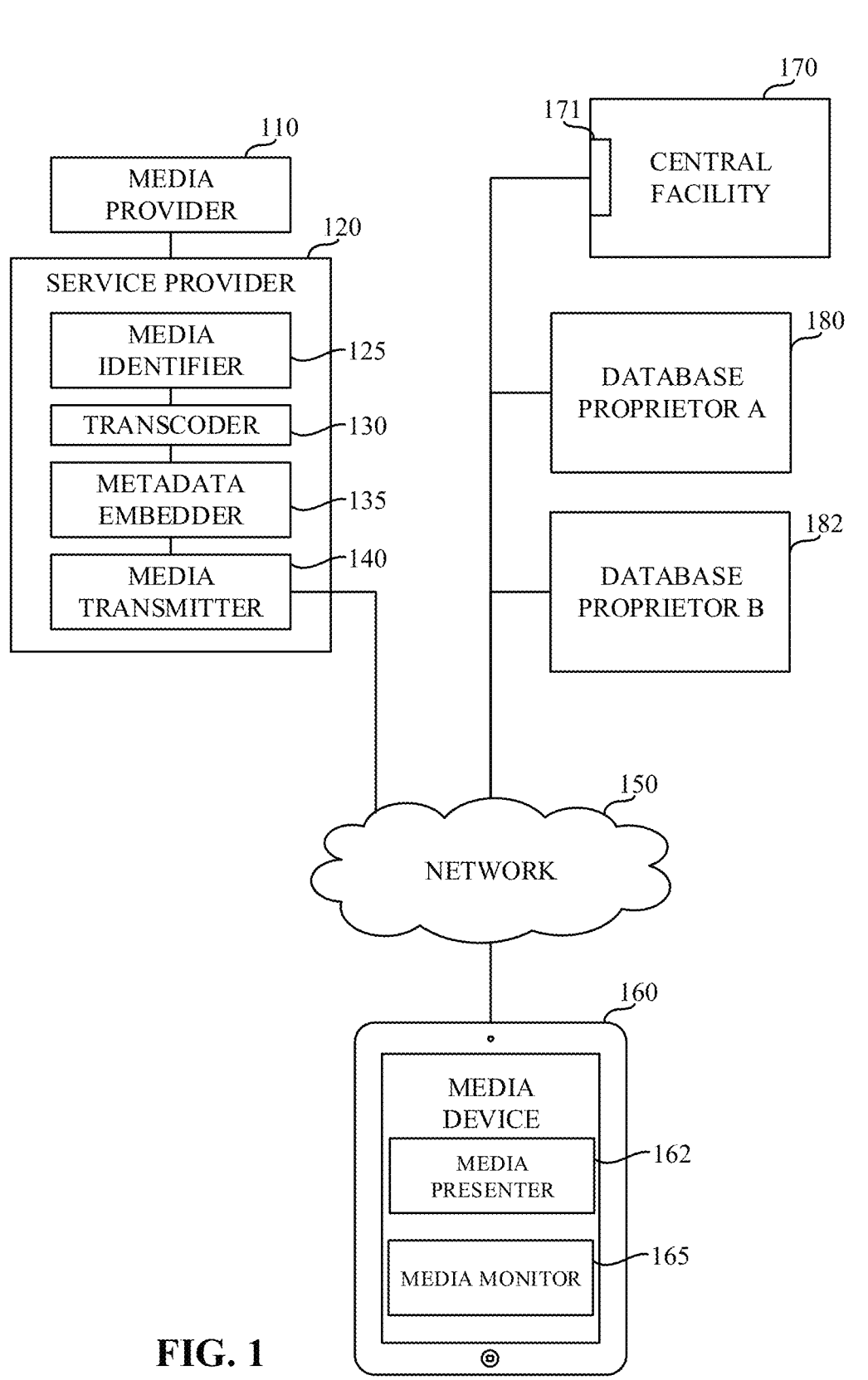
FIG. 1 is a diagram of an example system constructed in accordance with the teachings of this disclosure for measuring exposure to media.

Monitoring companies desire to gain knowledge on how users interact with media devices such as smartphones, tablets, laptops, smart televisions, etc. In particular, the media monitoring companies want to monitor media presentations at the media devices to, among other things, monitor exposure to advertisements, determine advertisement effectiveness, determine user behavior, identify purchasing behavior associated with various demographics, determine popularity ratings for media (e.g., content and/or advertisements), etc. In some examples, monitoring companies enlist panelists and collect demographic information about the panelists. Media presentation information is then collected in association with the panelists. However, it is difficult for monitoring companies to collect detailed demographic information from every user to whom media is presented (e.g., non-panelists). In examples disclosed herein, monitoring companies cooperate with database proprietors (e.g., Facebook, Twitter, Experian, etc.), sometimes referred to as data enrichment providers (DEPs), that have large databases of demographic information to extend media monitoring capabilities to non-panelists.

In examples disclosed herein, the presented media is identified using transcoded watermarks. The transcoded watermarks are transmitted as metadata (e.g., an ID3 tag) that is sent in association with and/or as part of the media to a media device. The media device (e.g., an iPad, a smart TV, etc.) extracts the metadata and transmits the metadata to the monitoring company and/or database proprietor. In some examples, the media device also transmits information that identifies the media device and/or a user of the media device to the monitoring company and/or database proprietor. In some examples, the metadata is encoded in such a way that the database proprietor does not know what media is identified, but can create associations of which users reported having been presented which different (but unidentifiable) media. However, the monitoring company is able to associate the metadata with a program identification.

In examples disclosed herein, metadata (e.g., an ID3 tag) is used to convey an identification of media presented at a media device. In some examples, the metadata represents a watermark and/or other media-identifying properties which may be present within the media. In examples disclosed herein, ID3 technology enables the digital measurement by passing the pre-packaged encrypted watermark information to monitoring functionality provided on media devices. Examples disclosed herein enable transmission of message(s) from the media device(s) to a media monitoring entity (e.g., The Nielsen Company (US), LLC) and/or to the database proprietor (e.g., Facebook, Twitter, Experian, etc.), in such a way that minute level demographics (and/or other granularity or granularities of demographics) can be attained. Moreover, the message(s) enable calculation of a unique audience metric at the database proprietor. To facilitate identification of the unique audience metric, the example database proprietor uses unique media identification.

Example approaches disclosed herein enable Digital TV ratings for mobile measurement using a census-based approach (e.g., using a demographic report from a database proprietor). Example approaches disclosed herein enable identification of an audience lift due to the media exposure on media devices in addition to other broadcast channels (e.g., TV). Example approaches disclosed herein are also applicable to measurement of PC/Desktop computer audience lift.

FIG. 1 is a diagram of an example system 100 constructed in accordance with the teachings of this disclosure for measuring exposure to media and shown in an example environment of use. The example system 100 of FIG. 1 monitors media provided by an example media provider 110 for presentation on an example media device 160 via an example network 150. The example system 100 includes an example central facility 170 of an audience measurement entity which cooperates with an example service provider 120, a first database proprietor 180, and a second database proprietor 182. While the illustrated example of FIG. 1 discloses an example implementation of the service provider 120, other example implementations of the service provider 120 may additionally or alternatively be used, such as the example implementations disclosed in U.S. patent application Ser. No. 13/341,646, U.S. patent application Ser. No. 13/443,596, U.S. patent application Ser. No. 13/793,991, U.S. patent application Ser. No. 13/445,961, U.S. patent application Ser. No. 13/472,170, U.S. patent application Ser. No. 13/793,983, U.S. patent application Ser. No. 13/767,548, U.S. patent application Ser. No. 13/793,959, U.S. patent application Ser. No. 13/778,108, U.S. Patent Application Ser. No. 61/813,019, U.S. patent application Ser. No. 13/963,737, U.S. Patent Application Ser. No. 61/889,505, U.S. Patent Application Ser. No. 61/890,176, U.S. patent application Ser. No. 14/144,352, U.S. Patent Application Ser. No. 61/813,019, and/or U.S. patent application Ser. No. 13/963,737, which are hereby incorporated by reference herein in their entirety.

The example media provider 110 of the illustrated example of FIG. 1 represents any one or more media provider(s) capable of providing media for presentation at the media device 160. The media provided by the media provider(s) 110 can be any type of media, such as audio, video, multimedia, webpages, etc. Additionally, the media can correspond to live (e.g., broadcast) media, stored media (e.g., on-demand content), etc.

The example service provider 120 of the illustrated example of FIG. 1 provides media services to the media device 160 via, for example, web pages including links (e.g., hyperlinks, embedded media, tags, etc.) to media provided by the media provider 110. In the illustrated example, the service provider 120 modifies the media provided by the media provider 110 prior to transmitting the media to the media device 160. In the illustrated example, the service provider 120 includes an example media identifier 125, an example transcoder 130, an example metadata embedder 135, and an example media transmitter 140.

The example media identifier 125 of FIG. 1 extracts metering data (e.g., signatures, watermarks, etc.) from the media obtained from the media provider 110. For example, the media identifier 125 can implement functionality provided, for instance, by a software development kit (SDK) provided, for instance by the audience measurement entity, to extract one or more audio watermarks, one or more video (e.g., image) watermarks, etc., embedded in the audio and/or video of the media obtained from the media provider 110. For example, the media may include pulse code modulation (PCM) audio data and/or other types of audio data, uncompressed video/image data, etc.

In some examples, the media identifier 125 of FIG. 1 determines (e.g., derives, decodes, converts, etc.) the metering data (e.g., media identifying information, source identifying information, etc.) included in and/or identified by a watermark embedded in the media and converts this metering data and/or the watermark itself into a text and/or binary format for inclusion in an ID3 tag and/or other data type (e.g., text, binary, etc.) for transmission as metadata (e.g., such as with a playlist or electronic program guide) accompanying the media (e.g., streaming media). For example, the code/watermark itself may be extracted and inserted as metadata in, for example, a text or binary format in the ID3 tag. Thus, the metadata and/or media-identifying metadata included in the ID3 tag may be a text or binary representation of a code, a watermark, and/or metadata or data identified by a code and/or watermark, etc. Additionally or alternatively, the watermark may be used to retrieve metering data from a local or remote database. In some examples, the media-identifying metadata is stored in a private frame of the ID3 tag.

In some examples, the watermark is a program content (PC) encoding watermark. PC encoding watermarks are inserted by media creators such as, for example, TV networks and/or TV syndicators (e.g., the example media provider 110 of FIG. 1). In some examples, the watermark is a final distribution (FD) encoding watermark. FD encoding watermarks are inserted by service providers such as, for example, Comcast, DirecTV, Dish Network, Time Warner, etc. (e.g., the example service provider 120 of FIG. 1). In some examples, the watermark is a packet identification header (PID) used for tuning of digital media.

In the illustrated example, the transcoder 130 employs any appropriate technique(s) to transcode and/or otherwise process the received media into a form suitable for streaming (e.g., a streaming format). For example, the transcoder 130 of the illustrated example transcodes the media in accordance with MPEG 4 audio/video compression for use with the HLS protocol. However, any other past, present, and/or future media protocol may additionally or alternatively be used.

In the illustrated example, the metadata embedder 135 embeds the metadata determined by the media identifier 125 and/or the media transcoded by the transcoder 130 into the transport stream(s) carrying the streaming media. In examples disclosed herein, watermarks are periodically placed in the media and/or or in association with the media every few seconds apart. In some examples, the sequence of watermarks represents a sequence of numbers and/or a sequence of time stamps. In some such examples, the watermarks also identify a media provider, a broadcaster, a media device, and/or the media itself (e.g., by season and episode, by title, etc.) In the illustrated example, the metadata embedder 135 embeds the metadata into an internal metadata channel, such as by encoding metadata that is in a binary and/or other appropriate data format into one or more data fields of the transport stream(s) that is(are) capable of carrying metadata. For example, the metadata embedder 135 can insert ID3 tag metadata corresponding to the metering metadata into the transport stream(s) that is (are) to stream the media in accordance with the Hypertext Transfer Protocol (HTTP) Live Streaming (HLS) protocol or other appropriate streaming protocol. Additionally or alternatively, the metadata embedder 135 may embed the metadata into an external metadata channel, such as by encoding the metadata into an M3U8 or other data file that is to be associated with (e.g., included in, appended to, sent prior to, sent after, etc.) the transport stream(s) that are to provide the streaming media to the media device 160.

The example media transmitter 140 of the illustrated example employs any appropriate technique(s) to select and/or stream the media to a requesting device, such as the media device 160. For example, the media transmitter 140 of the illustrated example selects media that has been identified by the media identifier 125, transcoded by the transcoder 130 and undergone metadata embedding by the metadata embedder 135. The media transmitter 140 then transmits (e.g., streams) the media to the media device 160 via the network 150 using HLS and/or any other streaming protocol.

In some examples, the media identifier 125, the transcoder 130, and/or the metadata embedder 135 prepare media for streaming regardless of whether (e.g., prior to) a request is received from the media device 160. In such examples, the already-prepared media is stored in a data store of the service provider 120 (e.g., such as in a flash memory, magnetic media, optical media, etc.). In such examples, the media transmitter 140 prepares a transport stream for streaming the already-prepared media to the media device 160 when a request is received from the media device 160. In other examples, the media identifier 125, the transcoder 130, and/or the metadata embedder 135 prepare the media for streaming in response to a request received from the media device 160.

The example network 150 of the illustrated example is the Internet. Additionally or alternatively, any other network(s) communicatively linking the service provider 120 and the media device 160 such as, for example, a private network, a local area network (LAN), a virtual private network (VPN), etc., may be used. The network 150 may comprise any number of public and/or private networks using any type(s) of networking protocol(s).

The example media device 160 of the illustrated example of FIG. 1 is a computing device that is capable of presenting media provided by the media transmitter 140 via the network 150. The example media device 160 of the illustrated example is capable of directly presenting media (e.g., via a display) while, in other examples, the media device 160 presents the media on separate media presentation equipment (e.g., speakers, a display, etc.). Thus, as used herein a "media device" may or may not be able to present media without assistance from a second device. Media devices are typically consumer electronics devices. For example, the media device 160 of the illustrated example is a tablet such as an Apple iPad®, and thus, is capable of directly presenting media (e.g., via an integrated display and speakers). While in the illustrated example, a tablet is shown, any other type(s) and/or number(s) of media device(s) may additionally or alternatively be used. For example, Internet-enabled mobile handsets (e.g., a smartphone, an iPod®, etc.), video game consoles (e.g., any generation of Xbox®, PlayStation®, etc.), tablet computers (e.g., an iPad®, a Motorola™ Xoom™, etc.), digital media players (e.g., a Roku® media player, a Slingbox®, a Tivo®, etc.), smart televisions, etc. may additionally or alternatively be used.

Media devices such as the media device 160 of FIG. 1 traditionally include a media presenter 162 such as a browser and/or an application (commonly referred to as an "app") for displaying media. A browser is an application for retrieving and displaying websites and media associated therewith. When retrieving and displaying webpages from websites, the browser and/or app may execute instructions such as, for example, JavaScript. In some examples, the instructions are provided as part of, and/or are referenced by, a webpage. In some examples, the instructions executed by the browser and/or app cause the browser and/or app to store information in association with the domain of the website. For example, the instructions can cause the browser and/or app to store information as a cookie. In some such examples, each time that the browser and/or app retrieves the webpage, the cookie is sent to the location from which the webpage is requested. However, only cookies associated with a domain of the website hosting requested webpage are transmitted. For example, cookies for the domain "xyz.com" are not transmitted when requesting "abc.com."

The example media device 160 of the illustrated example of FIG. 1 includes a media monitor 165 that monitors media presented by the media presenter 162 (e.g., the browser and/or app). In examples disclosed herein, the example media monitor 165 is instrumented as a component of the media presenter 162 by use of, for example, a software development kit (SDK), embedded instructions, an Application Programming Interface (API), etc. An example implementation of the example media monitor 165 is disclosed in further detail in connection with FIG. 3.

In the illustrated example, each of the example database proprietors 180, 182 of the illustrated example of FIG. 1 is implemented by a server hosted by an entity having a database identifying demographics of a set of individuals. As used herein, the example database proprietor is sometimes referred to as a data enrichment provider (DEP). The database proprietor 180, 182 cooperates with the audience measurement entity to collect and return media presentation information and demographic information associated therewith. In some examples, the example database proprietor 180, 182 includes entities such as wireless service carriers, mobile software/service providers, social networking sites (e.g., Facebook, Twitter, LinkedIn, Google, etc.), online retailer sites (e.g., Amazon.com, Buy.com, etc.), and/or any other Internet site that maintains user registration records (e.g., Yahoo!, MSN, Apple iTunes, Experian, etc.) While in the illustrated example of FIG. 1 there are two database proprietors, there may be any number (e.g., 1, 2, 3, 4, 5, etc.) of database proprietors.

In some examples, the database proprietors 180, 182 provide services to large numbers of users. In exchange for the provision of the service, the users register with the database proprietor. As part of this registration, the users provide detailed demographic information such as, for example, their home mailing address, their credit score, their race and/or ethnicity, their age, their yearly income, etc. A database proprietor, as part of the use of the provided service (e.g., a social networking service, a shopping service, a news service, etc.), has the ability to set and/or collect cookies stored by a browser of a user device accessing its domain (e.g., the Facebook.com domain) and, therefore, can identify a user of the service when the user transmits a request to the database proprietor 180, 182 by retrieving the cookies from the user device. Although this example speaks of cookies, any other type of user identifier may be employed.

The example central facility 170 of the audience measurement entity of the illustrated example of FIG. 1 includes an interface (e.g., a network communicator 171) to receive reported metering information (e.g., metadata) from the media monitor 165 of the media device 160 and/or the database proprietor 180, 182, via the network 150. In the illustrated example, the central facility 170 includes a network interface (e.g., an HTTP interface) to receive monitoring messages (e.g., HTTP messages) that include the metering information. Additionally or alternatively, any other method(s) to receive metering information may be used such as, for example, an HTTP Secure protocol (HTTPS), a file transfer protocol (FTP), a secure file transfer protocol (SFTP), etc.

In the illustrated example, the central facility 170 instructs the metadata embedder 135 and/or, more generally, the service provider 120 to embed a tag in media to be transmitted to the media device 160. In the illustrated example, the tag is formatted as an ID3 tag. However, the tag may be formatted using any other past, present, and/or future techniques such as, for example, a JavaScript instruction. Moreover, any other format of tag and/or instructions may additionally or alternatively be used. In some examples, the metadata embedder 135 is provided to the service provider 120 by the audience measurement entity.

In the illustrated example, the central facility 170 stores and analyzes metering information received from a plurality of different media devices and/or from the database proprietor(s) 180, 182. For example, the central facility 170 may sort and/or group metering information by media provider 110 (e.g., by grouping all metering data associated with a particular media provider 110). Any other processing of metering information may additionally or alternatively be performed. In the illustrated example, the central facility 170 is associated with an audience measurement company which is a neutral third party who is not involved with the delivery of media to the media device. The neutrality of the AME is maintained by not being a media creator or distributor. As such, the AME can measure media exposure without fear of bias.

Although the following examples refer to an audience measurement entity, any monitoring entity may fill this role. In the illustrated example of FIG. 1, to track media impressions on a media device 160, an audience measurement entity (AME) partners with or cooperates with the service provider 120 to create a webpage that includes monitoring instructions. In the illustrated example, the AME provides a software development kit (SDK) to the service provider 120. The SDK of the examples disclosed herein is a set of development tools (e.g., libraries (e.g., dynamically linked libraries (DLLs)), application programming interfaces (APIs), instructions, JavaScript files, etc.) that enable the service provider 120 to integrate monitoring instructions into the webpage and/or app transmitted to the media device 160. For example, the SDK facilitates creation of apps (e.g., instrumented applications) that include media monitor 165 for execution on the media device 160. Moreover, in some examples where the media is presented using a browser, the media monitor 165 may be implemented using JavaScript instructions. In examples disclosed herein, the monitoring instructions implementing the media monitor 165 enable the media device 160 to collect media-identifying metadata (e.g., metadata included in an ID3 tag), as well as identification of the user device and/or demographics of the corresponding user via interaction with a database provider.

Figure 2:
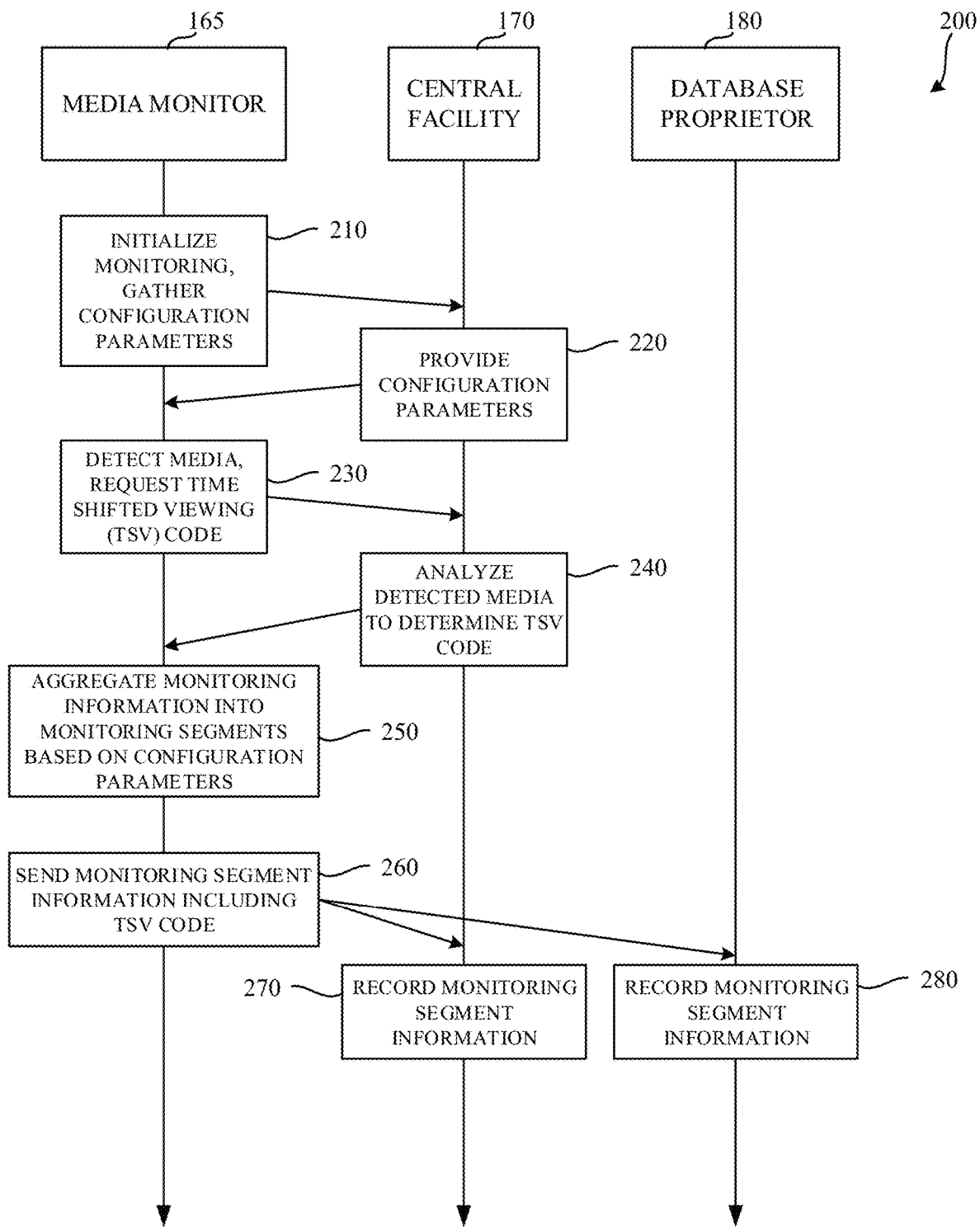
FIG. 2 is an example communications diagram illustrating an example order of communications between the example media monitor, the example central facility, and the example database proprietor of FIG. 1.

FIG. 2 is an example communications diagram 200 illustrating an example sequence of communications between the example media monitor 165, the example central facility 170, and the example database proprietor 180 of FIG. 1. The example communications diagram 200 begins when the example media monitor 165 is initialized. (block 210). The example media monitor 165 may be initialized upon, for example, loading of a web page, launching of an app, the beginning of a media presentation on a webpage, the beginning of a media presentation within an app, etc. The example media monitor 165 requests configuration parameters from the central facility 170. The requested configuration parameters instruct the media monitor 165 as to how and/or when requests for time shifted viewing code(s) and/or monitoring information are/is to be sent. In the illustrated example of FIG. 2, the configuration parameters are requested upon each initialization of the media monitor 165. However, in some examples, the configuration parameters are only requested if the media monitor 165 determines that previously requested configuration parameters are out of date (e.g., a threshold amount of time has elapsed since the configuration parameters were previously requested). However, any other approach to determining when to request configuration parameters may additionally or alternatively be used.

In examples disclosed herein, the example request for configuration parameters includes information about the media monitor 165 such as, for example, the application in which the media monitor 165 is operating, the website and/or webpage in which the media monitor 165 is embedded or otherwise associated with, etc. The example central facility 170 identifies and provides the configuration parameters to the media monitor 165 based on the information about the media monitor 165. (block 220).

The example media monitor 165 detects a media presentation, and requests a time shifted viewing (TSV) code in connection with the presented media from the central facility 170. (block 230). The TSV code indicates whether the presented media is being presented in a time-shifted fashion and, if so, a characterization of the amount of time shift that has occurred from the initial broadcast and/or distribution of the media. The example media monitor 165, when requesting the TSV code, provides a media identifier of the media (e.g., a watermark detected within and/or in association with the media, an ID3 tag including a digital representation of the watermark, etc.) to the central facility 170. The example central facility 170 analyzes the detected media identifier to determine the TSV code (block 240). An example approach to determining a TSV code is described below in connection with FIG. 10. The determined TSV code is provided to the media monitor 165 for inclusion in monitoring information that will be sent to the central facility 170 and/or the database proprietor 180. In examples disclosed herein, the TSV code is requested once per media presentation session (e.g., while displaying the same media). If, for example, the media monitor 165 detects that the media has been changed (e.g., a new web page is loaded in a browser, etc.) the media monitor 165 may request a new TSV code for reporting in subsequent monitoring information.

The media monitor 165 of this example monitors the media presentation and aggregates monitoring information into monitoring segments based on the received configuration parameters. (block 250). An example approach for aggregating monitoring information is described in connection with FIGS. 8 and 9, below. The media monitor 165 of this example sends the monitoring segment information (which includes the TSV code provided by the central facility 170) to the central facility 170 and the database proprietor 180. The central facility 170 and the database proprietor 180 each record the monitoring segment information. (blocks 270, 280). The recorded monitoring information may later be used to prepare media presentation reports.

Figure 3:
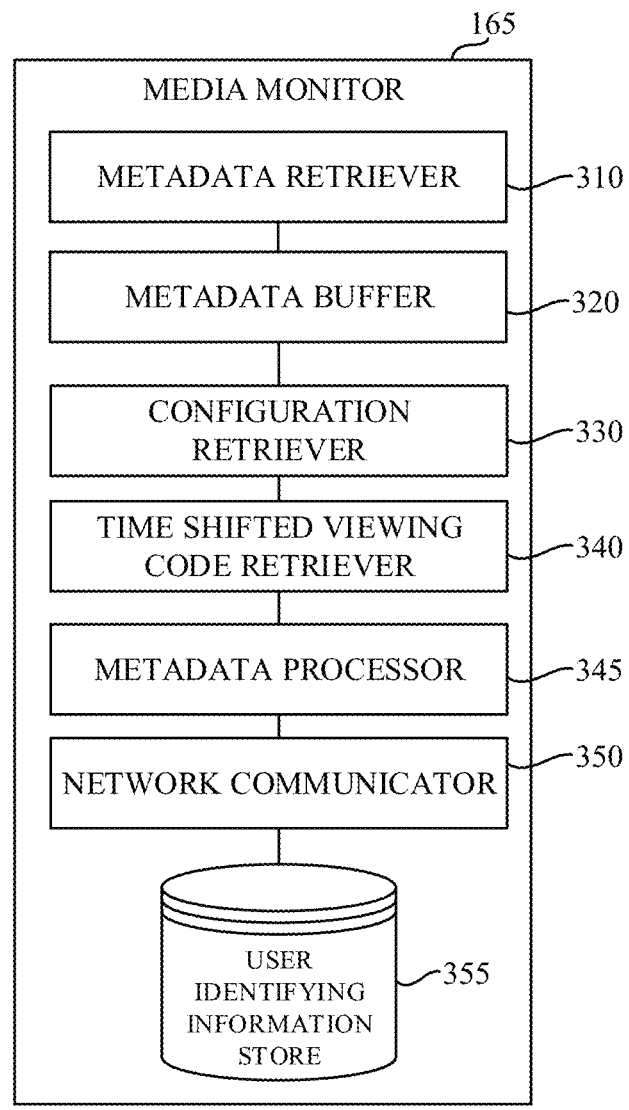
FIG. 3 is a block diagram of an example implementation of the media monitor of FIG. 1.

FIG. 3 is a block diagram of an example implementation of the media monitor 165 of FIG. 1. The media monitor 165 of the illustrated example of FIG. 3 includes an example metadata retriever 310, an example configuration retriever 330, an example time shifted viewing code retriever 340, an example metadata processor 345, an example network communicator 350, and an example user identifying information store 355.

The example metadata retriever 310 retrieves metadata from the media presenter 162 upon detection of an event notification by the media presenter 162. In some examples, the metadata is formatted as an ID3 tag and includes a digital representation of a watermark. In the illustrated example, the metadata retriever 330 retrieves the metadata by inspecting a document object model (DOM) object of the media presenter 162 using JavaScript. While JavaScript is used to retrieve the DOM object in the illustrated example, any other framework, such as, for example, ActiveX, Microsoft Silverlight, etc., may be used to retrieve the DOM object. Moreover, any other approach to retrieving metadata may additionally or alternatively be used.

In some examples, the metadata retriever 330 retrieves operational information about the media presenter 162 and/or, more generally, the media device 160. The retrieved operational information may include, for example, information about whether the media presenter 162 is fully or partially visible (e.g., the media presenter 162 is fully viewable, the media presenter 162 is 50% viewable, the media presenter 162 is not viewable, etc.), information about whether the media presenter 162 is in the foreground or background, information about the type of the media device 160, information about the operating system utilized by the media device 160, etc. In some examples, the operational information is transmitted to the central facility 170 and/or the database proprietor 180, 182 to enable computation of additional media presentation metrics (e.g., whether users listen to streaming audio with the media presenter 162 in the background, etc.), to distinguish media viewing habits between users of different types of devices (e.g., GOOGLE Android devices as compared to Apple iPhone® mobile devices).

The example configuration retriever 330 of the illustrated example of FIG. 3 requests configuration parameters from the central facility 170. In examples disclosed herein, the configuration parameters are retrieved using a hypertext transfer protocol (HTTP) request. However, any other past, present, and/or future protocol may additionally or alternatively be used to retrieve the configuration parameters. In examples disclosed herein, the example configuration retriever 330 requests configuration parameters upon initialization of the media presenter 165. For example, the configuration retriever 330 requests the configuration parameters upon loading of a webpage, launching of an application, etc. In some examples, the configuration retriever 330 first checks a cache (e.g., a memory) of the media device 160 for any stored configuration parameters to, for example, avoid transmitting additional requests for configuration parameters when such parameters are already known to the media monitor 165. In such examples, the received configuration parameters may be checked (e.g., by consulting a timestamp of the cached parameter(s)) to confirm the parameter(s) are not stale and/or out of date.

In examples disclosed herein, the request for configuration parameters includes information concerning the media presenter 162 such as, for example, a name of the media presenter 162, a webpage presented by the media presenter 162, a version number of the media presenter 162, etc. In some examples, the request for configuration parameters includes information concerning the user such as, for example, a user identifier, etc. Including information concerning the media presenter 162 and/or the user enables the central facility 170 to respond with appropriate configuration parameters for the environment in which the media monitor 165 is to be operated. For example, when the media monitor 165 is operated in connection with a browser, monitoring messages may be configured to be sent more frequently, as expected durations of web page viewing may be shorter than expected durations of viewing when using a dedicated streaming media application.

The example time shifted viewing code retriever 340 of the illustrated example of FIG. 3 requests a TSV code from the central facility 170. In some examples, media may be streamed for presentation at the media presenter 162 after its initial broadcast and/or distribution. For example, while media might have initially been broadcast at 7 PM on a Monday evening, a user might not choose to view the media until 8 PM on the following Tuesday evening. In such an example, the media presentation is considered "time shifted" in that the media is being streamed and/or presented at a time other than its initial broadcast and/or distribution time. To identify the media as time shifted, the example time shifted code retriever 340 transmits a media identifier of the presented media to the central facility 170 in a request for a TSV code. In examples disclosed herein, the TSV code is retrieved using a hypertext transfer protocol (HTTP) request. However, any other past, present, and/or future protocol may additionally or alternatively be used to retrieve the TSV code. The central facility 170 analyzes the media identifier to determine its initial time of broadcast as compared to the time of presentation (e.g., the time at which the request for the TSV code was transmitted to the central facility 170). The central facility 170 responds with the TSV code that is later included in monitoring information reported by the media monitor 165.

The example metadata processor 345 of the illustrated example of FIG. 3 analyzes the media identifiers stored in the metadata buffer 320 to determine whether a complete media presentation segment can be reported. In examples disclosed herein, the example metadata processor 345 determines that a media segment is complete when, for example, five one-minute periods have been sequentially monitored. However, any other approach and/or metric to determining whether a media segment is complete may additionally or alternatively be used. The example metadata processor 345 of FIG. 3 constructs a segment code representing whether media was presented for segments within a period of time (e.g., for each minute segment within a five-minute period of time) and transmits monitoring message(s) including the segment code and/or other media identifying information to the central facility 170 and/or database proprietor 180, 182.

The example network communicator 350 of the illustrated example of FIG. 3 transmits the media-identifying information and/or user-identifying information to the database proprietor 180, 182 via, for example, the Internet. While in some approaches, media-identifying information is transmitted in substantially real-time, in the illustrated example the media-identifying information is aggregated and is reported in one or more segments of monitoring information to the database proprietor 180, 182 and/or the central facility 170. Additionally or alternatively, the network communicator 350 may transmit a user identifier (e.g., a cookie, an identifier for advertising (IDFA), etc.) of the media device 160 and/or the media presenter 162 to enable the database proprietor 180, 182 to correlate the media presentation with a user, a demographic, etc. In some examples, the media-identifying information is encrypted before transmission by the network communicator 350. Encrypting the media-identifying information prevents the database proprietor 180, 182 from gaining access to information about what media is identified. In some examples, the network communicator 350 transmits the operational information retrieved by the metadata retriever 330 along with the media-identifying information.

The example user-identifying information store 355 of the illustrated example of FIG. 3 is implemented by a memory for storing information (e.g., user-identifying information, cookies, etc.) The example user-identifying information store 355 of the illustrated example of FIG. 3 may be any device for storing data such as, for example, flash memory, magnetic media, optical media, etc. In the illustrated example, the user-identifying information store 355 is implemented by random access memory of the client device 160. Furthermore, the data stored in the user-identifying information store 355 may be in any data format such as, for example, binary data, comma delimited data, tab delimited data, structured query language (SQL) structures, etc. While in the illustrated example the user-identifying information store 355 is illustrated as a single database, the user-identifying information store 355 may be implemented by multiple databases, and/or be stored in multiple memory locations of the media device. In the illustrated example, each piece of user identifying information is stored in association with a domain. When requests are transmitted, only the user-identifying information associated with the destination domain is sent.

Figure 4:
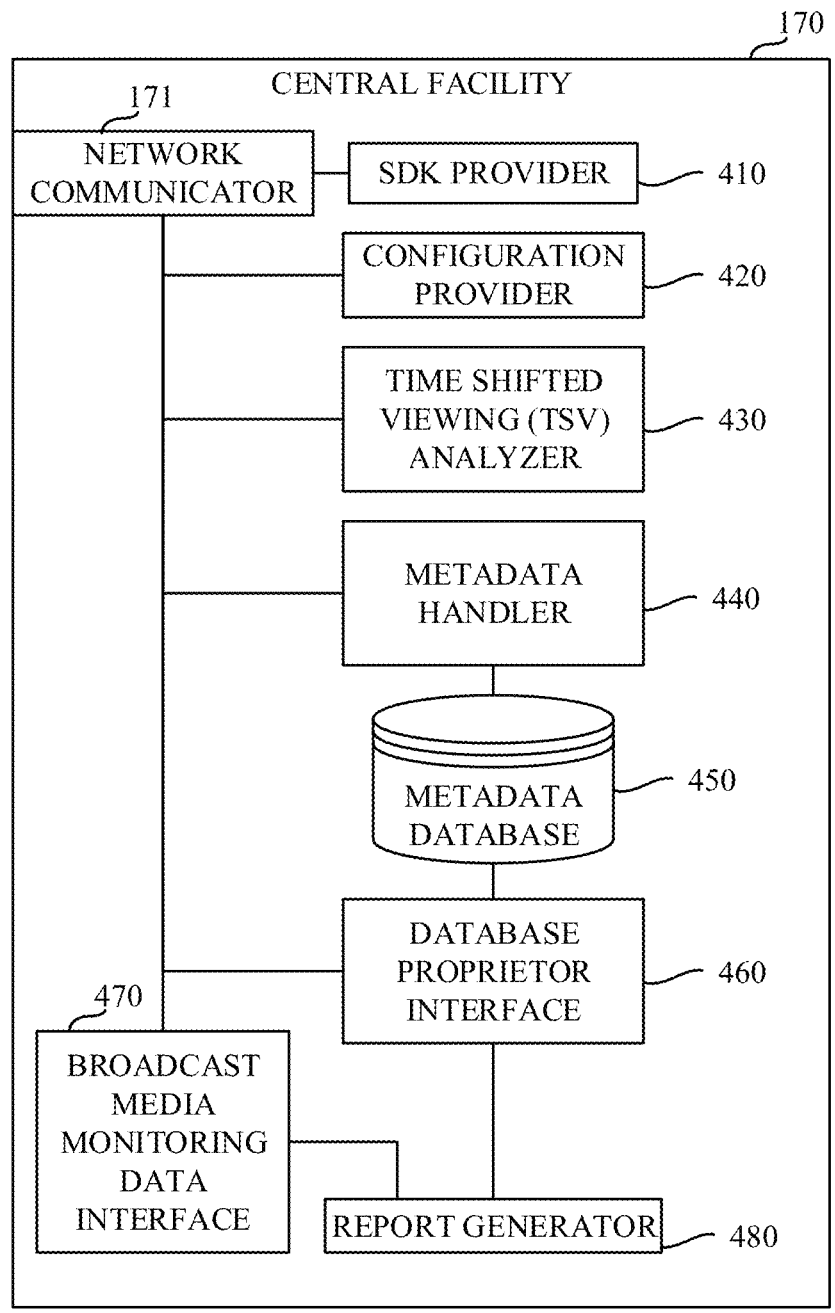
FIG. 4 is a block diagram of an example implementation of the central facility of FIG. 1.

FIG. 4 is a block diagram of an example implementation of the central facility 170 of FIG. 1. The central facility 170 of the illustrated example of FIG. 4 includes the network communicator 171, a software development kit (SDK) provider 410, a configuration provider 420, a time shifted viewing (TSV) analyzer 430, a metadata handler 440, a metadata database 450, a database proprietor interface 460, a broadcast media monitoring data interface 470, and a report generator 480.

The network communicator 171 of the illustrated example of FIG. 4 enables the central facility 170 to communicate with other devices (e.g., the media device 160) and/or entities (e.g., the database proprietor 180) via the internet (e.g., the network 150 of FIG. 1). In examples disclosed herein, the example network communicator 171 implements an HTTP server. However, any other past, present, and/or future protocols may additionally or alternatively be used to facilitate communication between the database proprietor and other devices and/or entities. In examples disclosed herein, the example network communicator 171 receives monitoring messages from the media monitor 165 that include, for example, media identifying information (which may be encrypted) identified by the media monitor 165. Such messages may be routed and/or delivered to the metadata handler 440 of the example central facility 170. In some examples, the network communicator 171 facilitates the receipt of information from other systems such as, for example a broadcast media monitoring system. Such information may be combined with demographic information received from the database proprietor 180 to, for example, prepare a report summarizing media exposure.

The example SDK provider 410 of the illustrated example of FIG. 4 provides instructions (e.g., an SDK) to application developers (e.g., the media provider 110, the service provider 120, etc.) to facilitate creation and/or delivery of the media monitor 165. In some examples, the instructions are provided as an SDK such that the application developer(s) can integrate the SDK, libraries (e.g., DLLs), and/or application programming interfaces (APIs) of the SDK into existing applications and/or webpages. While in the illustrated example the monitoring components are provided as an SDK, the monitoring components instrumented by the SDK and/or monitoring instructions provided via the SDK may be provided in any other fashion. For example, the monitoring components may be provided as an application programming interface (API), a plugin, an add-on, libraries, etc.

The example configuration provider 420 of the illustrated example of FIG. 4 provides configuration parameters to the configuration retriever 330 of the example media monitor 165. In examples disclosed herein, the example configuration provider 420 performs a lookup based on information provided by the configuration retriever 330 to identify the configuration parameters to be provided to the configuration retriever 330.

The example TSV analyzer 430 of the illustrated example of FIG. 4 analyzes a media identifier included in a request for a TSV code received from the TSV code retriever 340 of the example media monitor 165. In examples disclosed herein, the TSV analyzer 430 determines a distribution timestamp included in a media identifier, and compares the distribution timestamp to a viewing timestamp (e.g., a time at which the media is presented, a time at which the request for the TSV code is received) to determine whether time shifted viewing is occurring and, if so, how much has the viewing been shifted from the initial distribution and/or broadcast. In examples disclosed herein, the example TSV analyzer determines the time difference in hours, and performs a lookup to determine a corresponding TSV code. In some examples, the TSV analyzer 430 analyzes the type of media identifier to determine whether time shifted viewing can be accurately identified. For example, in some instances, the media identifying information might not include a distribution timestamp and, as a result, no time difference can be calculated. In some examples, an encoding of the timestamp is analyzed to determine whether the timestamp can be accurately used to determine a time difference between an initial broadcast and/or distribution time and a viewing time. For example, some media identifiers might utilize a timestamp indicative of a time of within the media (e.g., the fifth minute of the media), rather than a distribution time of the media. In such an example, the timestamp cannot reliably be used to determine whether time shifted viewing is occurring, and the example TSV analyzer 430 responds with a TSV code indicating that the time shifted viewing status of the media is unknown.

The example metadata handler 440 of the illustrated example of FIG. 4 prepares a control file for use by the database proprietor 180, 182. The example control file specifies media identifier and segment code pairs that correspond to a same originator, program, telecast, stream, etc. The correspondence of the media identifier and segment code pairs to various originators, programs, telecasts, streams, etc., when provided to the database proprietor 180, 182, enables the database proprietor 180, 182 to summarize and/or aggregate demographic information in association with an originator, a program, a telecast, a stream, and/or any combination thereof. In some examples, the identities of the originators, programs, telecasts, streams, etc. are obfuscated (e.g., encrypted, translated, etc.) from the database proprietor 180, 182 such that while the database proprietor can identify that a media identifier and segment code pair corresponds to a same originator, program, telecast, stream, etc., the database proprietor cannot affirmatively identify the originator, program, telecast, stream, etc. Such identification may be performed at the central facility and/or audience measurement entity to affirmatively identify the media.

The example metadata database 450 is implemented by a memory for storing media-identifying metadata received from the media monitor. Moreover, the example metadata database 450 stores demographic information and metadata received from the database proprietor 180, 182 via the database proprietor interface 460. The example metadata database 450 of the illustrated example of FIG. 4 may be implemented by any device for storing data such as, for example, flash memory, magnetic media, optical media, etc. In the illustrated example, the metadata database 450 is implemented by random access memory of the central facility 170. Furthermore, the data stored in the metadata database 450 may be in any data format such as, for example, binary data, comma delimited data, tab delimited data, structured query language (SQL) structures, etc. While in the illustrated example the metadata database 450 is illustrated as a single database, the metadata database 450 may be implemented by multiple databases, and/or be stored in multiple memory locations of the central facility 170.

The database proprietor interface 460 of the illustrated example of FIG. 4 transmits the control file and/or requested aggregation(s) to the database proprietor 180, 182. In response, the database proprietor interface 460 receives demographic information corresponding to a unique audience value and/or demographic distribution information from the database proprietor 180, 182.

The example broadcast media monitoring data interface 470 of the illustrated example of FIG. 4 receives broadcast media monitoring data from a broadcast media monitoring system operated by the audience measurement entity and/or by a third party. The broadcast media monitoring data describes audience and/or demographic information for media distribution channels that are not be monitored by the media monitor 165 of FIG. 1. For example, whereas the media monitor 165 of FIG. 1 monitors and reports information concerning streaming media presented by the media presenter 162, the media monitor 165 might not monitor media that is presented using other (e.g., non-streaming) distribution channels such as, for example, terrestrial broadcast distribution channels, satellite broadcast distribution channels, etc. The example broadcast media monitoring data interface 470 enables the combination of streaming media monitoring information with broadcast media monitoring information.

The example report generator 480 of the illustrated example of FIG. 4 prepares reports of streaming media information received from the database proprietor 180, 182 and/or the broadcast media monitoring data interface 470. For example, the example report generator may utilize the streaming media information in combination with the broadcast media information to estimate a total size of an audience for a given media. Moreover, demographic distribution report(s) may be generated to enable a better understanding of the totality of the audience for a given media (e.g., to display demographic information for streaming media users as compared to non-streaming media users).

Figure 5:
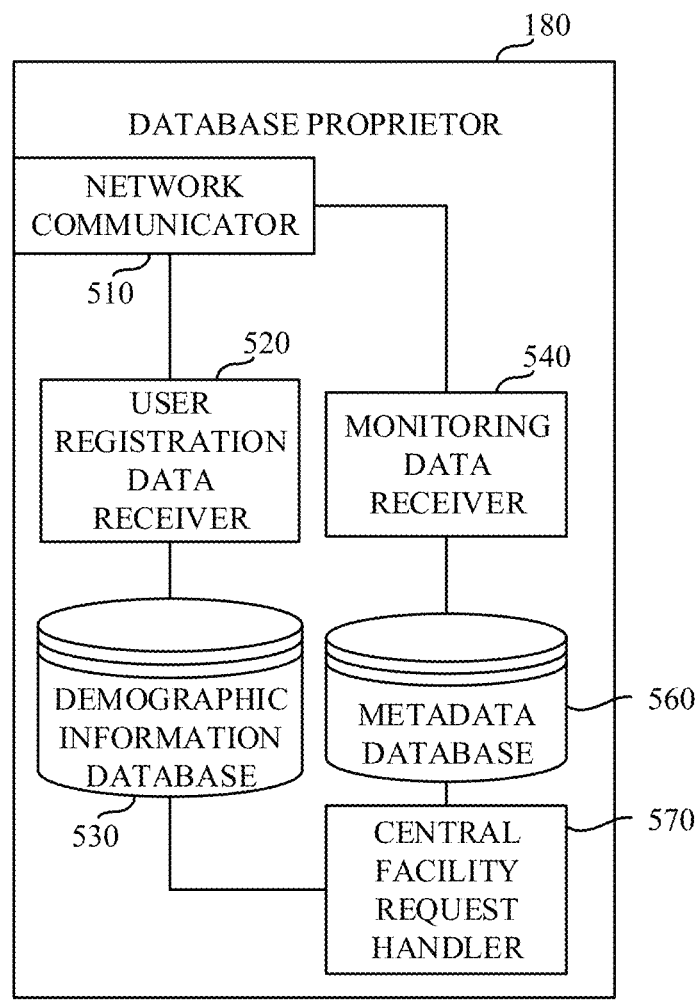
FIG. 5 is a block diagram of an example implementation of the database proprietor of FIG. 1.

FIG. 5 is a block diagram of an example implementation of the database proprietor 180, 182 of FIG. 1. The database proprietor 180, 182 of the illustrated example of FIG. 5 includes a network communicator 510, a user registration data receiver 520, a demographic information database 530, a monitoring data receiver 540, a metadata database 560, and a central facility request handler 570.

The example network communicator 510 of the illustrated example of FIG. 4 enables the database proprietor 180 to communicate with other devices (e.g., the media device 160) and/or entities (e.g., the central facility 170) via the internet (e.g., the network 150 of FIG. 1). In examples disclosed herein, the example network communicator 510 implements an HTTP server. However, any other past, present, and/or future protocols may additionally or alternatively be used to facilitate communication between the database proprietor and other devices and/or entities. In the illustrated example, the example network communicator 510 receives monitoring information (e.g., in the form of an HTTP request) from the media monitor 165 that include, for example, user identifiers, and/or media identifying information (which may be encrypted) identified by the media monitor 165. The example network communicator 510 of FIG. 5 responds to the requests from the media monitor 165 with an HTTP acknowledge message and/or an HTTP redirect message. While in the illustrated example, the network communicator 510 communicates using the HTTP protocol, any other protocol may additionally and/or alternatively be used such as, for example, the HTTPS protocol, the FTP protocol, etc.

The example user registration data receiver 520 of the illustrated example of FIG. 5 receives registration data from the user of the client device 160. The registration data may include, for example, demographic information, a username, geographic information, and/or any other information associated with the user. In the illustrated example, the user registration data receiver 520 receives the registration information from the user via the network communicator 510. That is, the registration information is received via a network such as, for example, the Internet. However, the user information may be received in any other fashion. For example, the user registration data may be received via a telephone call, facsimile transmission, manual entry, etc. The user registration data receiver 520 of the illustrated example of FIG. 5 stores the user registration data in the demographic information database 530.

The example demographic information database 530 of the illustrated example is implemented by a memory for storing user registration data (e.g., demographic information associated with users). The example demographic information database 530 of the illustrated example of FIG. 5 may be any device for storing data such as, for example, flash memory, magnetic media, optical media, etc. In the illustrated example, the demographic information database 530 is implemented by random access memory of the database proprietor 180, 182. Furthermore, the data stored in the demographic information database 530 may be in any data format such as, for example, binary data, comma delimited data, tab delimited data, structured query language (SQL) structures, etc. While in the illustrated example the demographic information database 530 is illustrated as a single database, the demographic information database 530 may be implemented by multiple databases, and/or be stored in multiple memory locations of the database proprietor 180, 182.

The example monitoring data receiver 540 of the illustrated example of FIG. 5 receives a monitoring message from the media monitor 165 via the network communicator 510. The monitoring message may include user identifying information and/or media identifying metadata. The monitoring data receiver 540 analyzes the received monitoring message to extract media identifying metadata, extract media presentation information, extract user-identifying metadata, etc. The example monitoring data receiver stores the extracted information in the metadata database 560.

The metadata database 560 is implemented by a memory for storing media-identifying metadata received from the media monitor 165. The example metadata database 560 of the illustrated example of FIG. 5 may be implemented by any device for storing data such as, for example, flash memory, magnetic media, optical media, etc. In the illustrated example, the metadata database 560 is implemented by random access memory of the database proprietor 180, 182. Furthermore, the data stored in the metadata database 560 may be in any data format such as, for example, binary data, comma delimited data, tab delimited data, structured query language (SQL) structures, etc. While in the illustrated example the metadata database 560 is illustrated as a single database, the metadata database 560 may be implemented by multiple databases, and/or be stored in multiple memory locations of the database proprietor 180, 182. Furthermore, while in the illustrated example the metadata database 560 and the demographic information database 530 are implemented as separate databases, the example metadata database 560 and the example demographic information database 530 may be implemented using a single (i.e., the same) database.

The example central facility request handler 570 receives a control file from the database proprietor interface 460 of the example central facility 170 of FIG. 4. As noted above, the example control file specifies media identifier and segment code pairs that correspond to a same originator, program, telecast, stream, etc.

The correspondence of the media identifier and segment code pairs to various originators, programs, telecasts, streams, etc. enables the central facility request handler 570 to summarize and/or aggregate demographic information in association with an originator, a program, a telecast, a stream, and/or any combination thereof. In some examples, the originator, program telecast, stream, etc. are obfuscated and/or otherwise transformed to prevent the database proprietor 180, 182 from affirmatively identifying an originator, program, telecast, stream, etc. For example, the program "Modern Family" may be identified as "1A8F2CDE". In such an example, the central facility request handler 570 can summarize and/or aggregate media presentations corresponding to the program "1A8F2CDE", but cannot otherwise identify that program as "Modern Family."

Moreover, monitoring messages may specify additional information that may be used to summarize and/or aggregate demographic information such as, for example, a type of device used to present the media, an operating system of the device used to present the media, a country in which the media was presented, etc. The example central facility request handler 570 transmits demographic information associated with users to which media (identified by the media identifier and segment code pair) was presented to the central facility 170. In the illustrated example, the central facility request handler 570 transmits demographic information and the associated media-identifying metadata (which may be encrypted) when the media has been presented to a threshold number of users. As such, the demographic information is aggregated across the users to which the media was presented. However, in some examples, demographic information is transmitted on an individual basis. In the illustrated example, the central facility request handler 570 transmits the data to the central facility 170 regardless of whether the central facility 170 has requested the data. For example, the demographic information may be transmitted on a periodic basis (e.g., every three hours, daily, etc.). However, in some examples, the central facility 170 may request the central facility request handler 570 to transmit the data.

While an example manner of implementing the example service provider 120 of FIG. 1 is illustrated in FIG. 1, one or more of the elements, processes and/or devices illustrated in FIG. 1 may be combined, divided, re-arranged, omitted, eliminated and/or implemented in any other way. While an example manner of implementing the example media monitor 165 is illustrated in FIGS. 1 and/or 3, one or more of the elements, processes and/or devices illustrated in FIGS. 1 and/or 3 may be combined, divided, re-arranged, omitted, eliminated and/or implemented in any other way. While an example manner of implementing the example central facility 170 is illustrated in FIGS. 1 and/or 4, one or more of the elements, processes and/or devices illustrated in FIGS. 1 and/or 4 may be combined, divided, re-arranged, omitted, eliminated and/or implemented in any other way. While an example manner of implementing the example database proprietor 180 is illustrated in FIGS. 1 and/or 5 one or more of the elements, processes and/or devices illustrated in FIGS. 1 and/or 5 may be combined, divided, re-arranged, omitted, eliminated and/or implemented in any other way.

Further, the example media identifier 125, the example transcoder 130, the example metadata embedder 135, the example media transmitter 140, and/or, more generally, the example service provider 120 of FIG. 1, example metadata retriever 310, the example configuration retriever 330, the example time shifted viewing code retriever 340, the example metadata processor 345, the example network communicator 350, and/or, more generally, the example media monitor 165 of FIGS. 1 and/or 3, the example network communicator 171, the example SDK provider 410, the example configuration provider 420, the example time shifted viewing analyzer 430, the example metadata handler 440, the example database proprietor interface 460, the example broadcast media monitoring data interface 470, the example report generator 480, and/or, more generally, the example central facility 170 of FIGS. 1 and/or 4, the example network communicator 510, the example user registration data receiver 520, the example monitoring data receiver 540, the example central facility request handler 570, and/or, more generally, the example database proprietor 180 of FIGS. 1 and/or 5 may be implemented by hardware, software, firmware and/or any combination of hardware, software and/or firmware. Thus, for example, any of the example media identifier 125, the example transcoder 130, the example metadata embedder 135, the example media transmitter 140, and/or, more generally, the example service provider 120 of FIG. 1, example metadata retriever 310, the example configuration retriever 330, the example time shifted viewing code retriever 340, the example metadata processor 345, the example network communicator 350, and/or, more generally, the example media monitor 165 of FIGS. 1 and/or 3, the example network communicator 171, the example SDK provider 410, the example configuration provider 420, the example time shifted viewing analyzer 430, the example metadata handler 440, the example database proprietor interface 460, the example broadcast media monitoring data interface 470, the example report generator 480, and/or, more generally, the example central facility 170 of FIGS. 1 and/or 4, the example network communicator 510, the example user registration data receiver 520, the example monitoring data receiver 540, the example central facility request handler 570, and/or, more generally, the example database proprietor 180 of FIGS. 1 and/or 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media identifier 125, the example transcoder 130, the example metadata embedder 135, the example media transmitter 140, and/or, more generally, the example service provider 120 of FIG. 1, example metadata retriever 310, the example configuration retriever 330, the example time shifted viewing code retriever 340, the example metadata processor 345, the example network communicator 350, and/or, more generally, the example media monitor 165 of FIGS. 1 and/or 3, the example network communicator 171, the example SDK provider 410, the example configuration provider 420, the example time shifted viewing analyzer 430, the example metadata handler 440, the example database proprietor interface 460, the example broadcast media monitoring data interface 470, the example report generator 480, and/or, more generally, the example central facility 170 of FIGS. 1 and/or 4, the example network communicator 510, the example user registration data receiver 520, the example monitoring data receiver 540, the example central facility request handler 570, and/or, more generally, the example database proprietor 180 of FIGS. 1 and/or 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example service provider 120 of FIG. 1, the example media monitor 165 of FIGS. 1 and/or 3, the example central facility 170 of FIGS. 1 and/or 4, the example database proprietor 180 of FIGS. 1 and/or 5 may include one or more elements, processes and/or devices in addition to, or instead of, those illustrated in FIGS. 1, 3, 4, and/or 5, and/or may include more than one of any or all of the illustrated elements, processes and devices.

Figure 6:
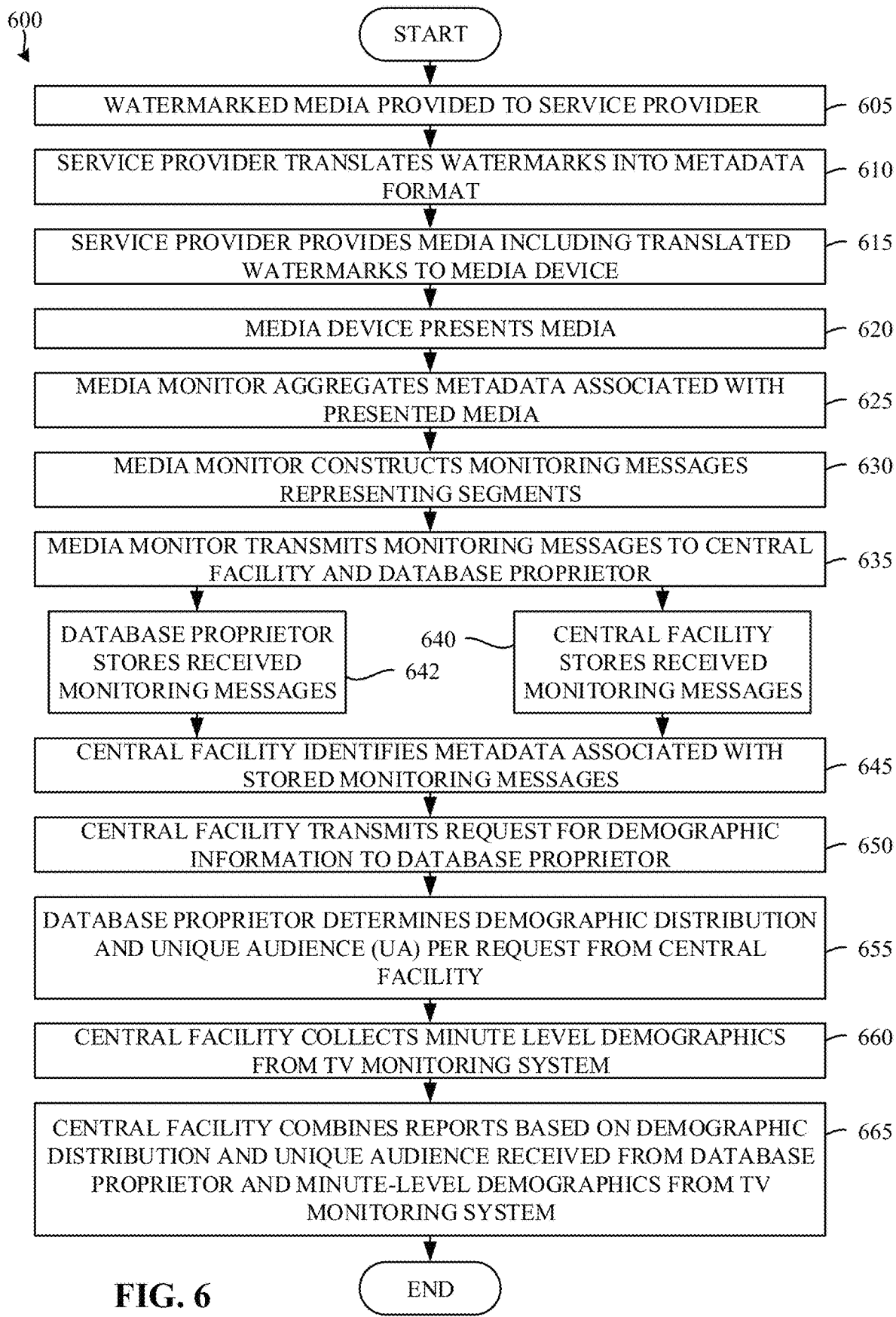
FIG. 6 is a flowchart representative of example machine readable instructions which may be executed to monitor a media presentation.

Flowchart(s) representative of example machine readable instructions for implementing the example service provider 120 of FIG. 1 is/are shown in FIGS. 6 and/or 7. In these examples, the machine readable instructions comprise a program(s) for execution by a processor such as the processor 1612 shown in the example processor platform 1600 discussed below in connection with FIG. 16. The program may be embodied in software stored on a tangible computer readable storage medium such as a CD-ROM, a floppy disk, a hard drive, a digital versatile disk (DVD), a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowchart(s) illustrated in FIGS. 6 and/or 7, many other methods of implementing the example service provider 120 may alternatively be used. For example, the order of execution of the blocks may be changed, and/or some of the blocks described may be changed, eliminated, or combined.

Figure 8:
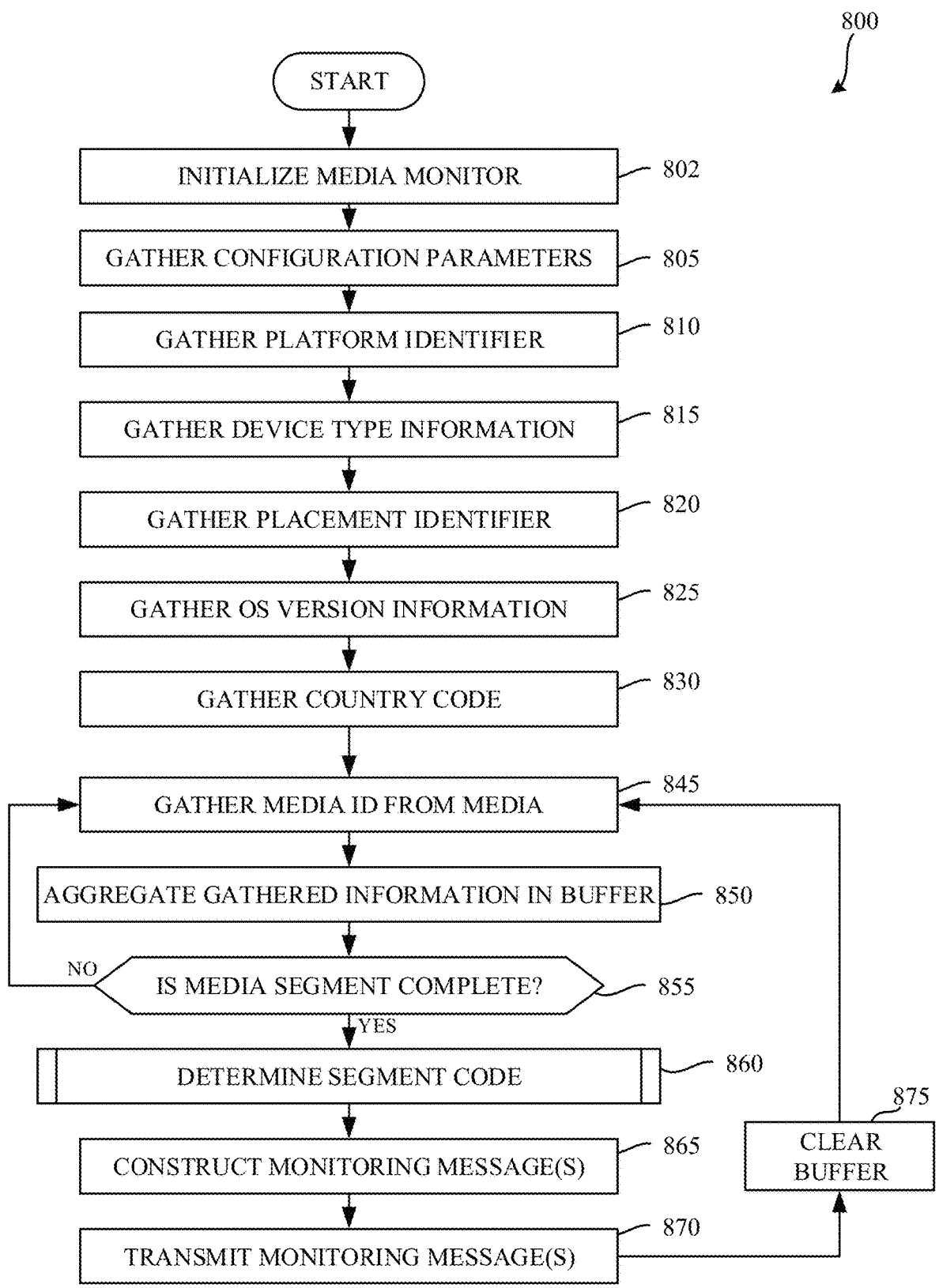
FIG. 8 is a flowchart representative of example machine readable instructions which, when executed, cause the media monitor of FIGS. 1 and/or 3 to aggregate and transmit monitoring information to the central facility and/or the database proprietor.

Flowchart(s) representative of example machine readable instructions for implementing the example media monitor 165 of FIGS. 1 and/or 3 is/are shown in FIGS. 6, 8, and/or 9. In these examples, the machine readable instructions comprise a program(s) for execution by a processor such as the processor 1712 shown in the example processor platform 1700 discussed below in connection with FIG. 17. The program may be embodied in software stored on a tangible computer readable storage medium such as a CD-ROM, a floppy disk, a hard drive, a digital versatile disk (DVD), a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowchart(s) illustrated in FIGS. 6, 8, and/or 9, many other methods of implementing the example media monitor 165 may alternatively be used. For example, the order of execution of the blocks may be changed, and/or some of the blocks described may be changed, eliminated, or combined.

Figure 10:
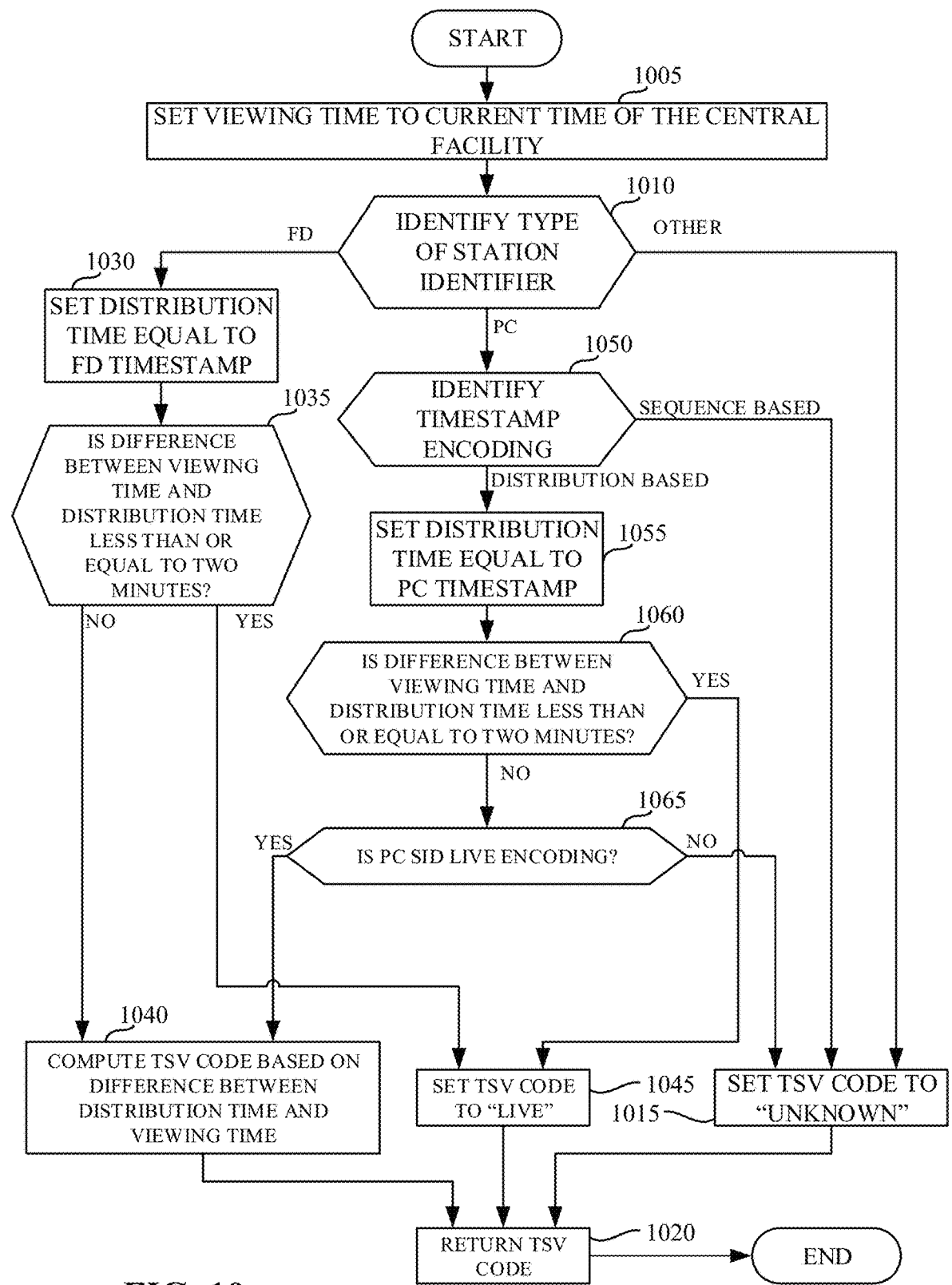
FIG. 10 is a flowchart representative of example machine readable instructions which, when executed, cause the central facility to provide a time shifted viewing code in response to a request for a time shifted viewing code from the media monitor.
Figure 12:
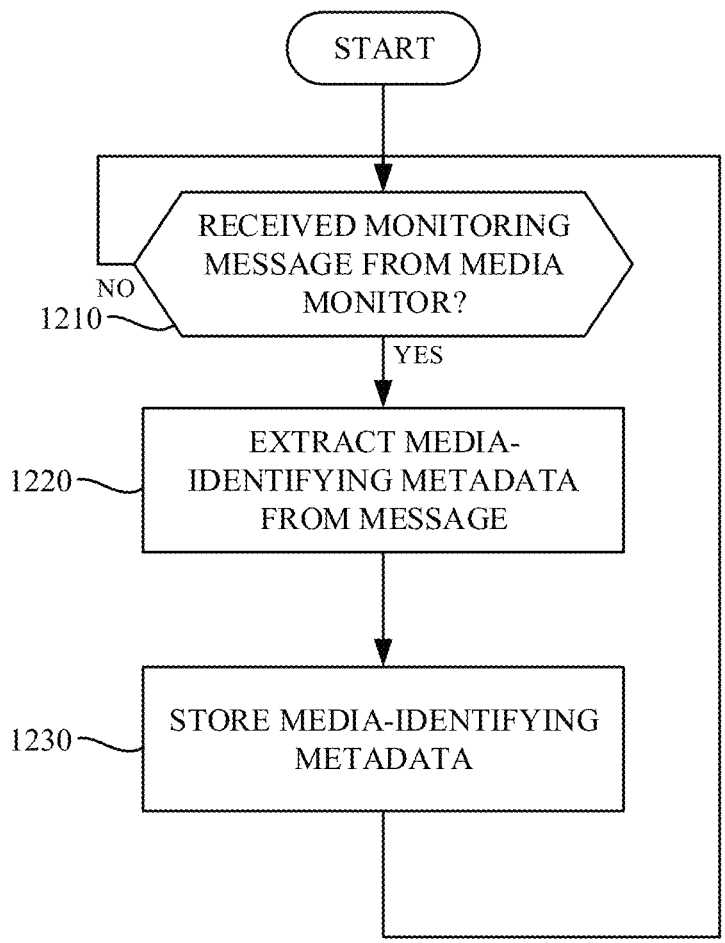
FIG. 12 is a flowchart representative of example machine readable instructions which, when executed, cause the central facility to receive a monitoring message from the media monitor of FIG. 1.

Flowchart(s) representative of example machine readable instructions for implementing the example central facility 170 FIGS. 1 and/or 4 is/are shown in FIGS. 6, 10, 12, and/or 13. In these examples, the machine readable instructions comprise a program(s) for execution by a processor such as the processor 1812 shown in the example processor platform 1800 discussed below in connection with FIG. 18. The program may be embodied in software stored on a tangible computer readable storage medium such as a CD-ROM, a floppy disk, a hard drive, a digital versatile disk (DVD), a Blu-ray disk, or a memory associated with the processor 1812, but the entire program and/or parts thereof could alternatively be executed by a device other than the processor 1812 and/or embodied in firmware or dedicated hardware. Further, although the example program is described with reference to the flowchart(s) illustrated in FIGS. 6, 10, 12, and/or 13, many other methods of implementing the example central facility 170 may alternatively be used. For example, the order of execution of the blocks may be changed, and/or some of the blocks described may be changed, eliminated, or combined.

Figure 11:
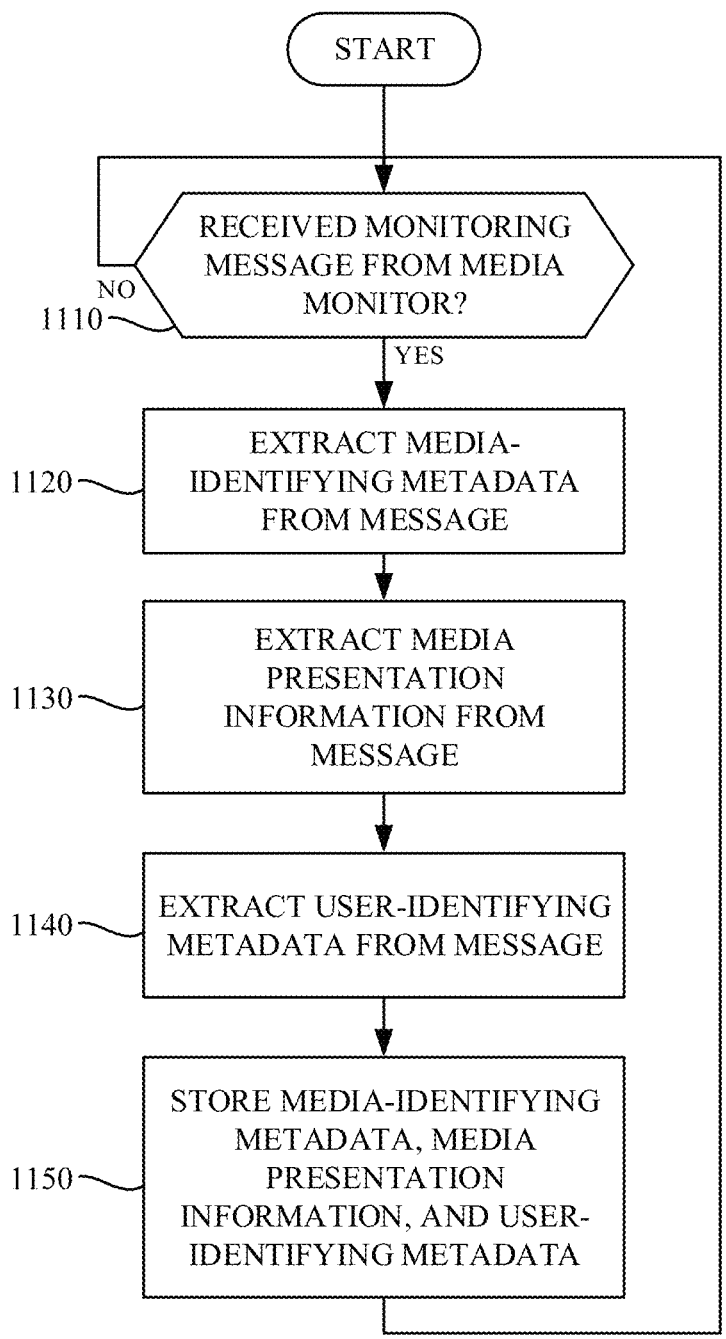
FIG. 11 is a flowchart representative of example machine readable instructions which, when executed, cause the database proprietor to receive a monitoring message from the media device of FIG. 1.

Flowchart(s) representative of example machine readable instructions for implementing the example database proprietor 180 of FIGS. 1 and/or 5 is/are shown in FIGS. 6, 11, and/or 15. In these examples, the machine readable instructions comprise a program(s) for execution by a processor such as the processor 1912 shown in the example processor platform 1900 discussed below in connection with FIG. 19. The program may be embodied in software stored on a tangible computer readable storage medium such as a CD-ROM, a floppy disk, a hard drive, a digital versatile disk (DVD), a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowchart(s) illustrated in FIGS. 6, 11, and/or 15, many other methods of implementing the example database proprietor 180 may alternatively be used. For example, the order of execution of the blocks may be changed, and/or some of the blocks described may be changed, eliminated, or combined.

As mentioned above, the example processes of FIGS. 6, 7, 8, 9, 10, 11, 12, 13, and/or 15 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6, 7, 8, 9, 10, 11, 12, 13, and/or 15 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flowchart representative of example machine readable instructions 600 which may be executed to monitor a media presentation. The program 600 of FIG. 6 begins at block 605 when watermarked media is provided to the service provider 120 by the media provider 110 (block 605). In some examples, the watermark is a program content (PC) encoding. PC encoding watermarks are inserted by media creators such as, for example, TV networks and/or TV syndicators (e.g., the example media provider 110 of FIG. 1). In some examples, the watermark is a final distribution (FD) encoding. FD encoding watermarks are inserted by service providers such as, for example, Comcast, DirecTV, Dish Network, Time Warner, etc. (e.g., the example service provider 120 of FIG. 1). In examples disclosed herein, watermarks are continuous and placed in the media every few seconds apart.

The watermark(s) of the watermarked media are then translated (e.g., transcoded, transmarked) by the service provider 120, into a metadata format such as, for example, an ID3 tag by the service provider 120. (block 610). An example approach to translating watermarks is described below in connection with FIG. 7. In examples disclosed herein, a PCM-2-ID3 SDK that is integrated with an encoder in the media distribution path (e.g., implementing the transcoder 130 at the service provider 120) decodes the watermark and creates one or more metadata packages (e.g., ID3 packets). The metadata packages are transmitted with and/or in association with the media. In examples disclosed herein, the metadata packages are spaced apart using ten second spacing. However, any other spacing may additionally or alternatively be used. The service provider 120 transmits the media for presentation at the media device 160. (block 615). The media is then presented by the media presenter 162 of the example media device 160. (block 620).

Some example systems credit media presentations on a minute-by-minute level. However, determining whether a user was presented with a complete minute of streaming media based on metadata segments can be difficult. For example, if metadata is transmitted that represents the media that is presented at the time of the transmission once every five minutes, there may not be enough resolution to determine whether the media was presented within each of the five minutes. Moreover, sending metadata every minute may still present difficulty with determining whether the media was presented for the complete minute. Furthermore, sending metadata every second may result in an excessive amount of metadata being transmitted, and might affect operation of the media device 160 (e.g., the metadata transmission may consume bandwidth and/or computing resources that might interfere with the presentation of the media).

In examples disclosed herein, the media monitor 165 of the example media device 160 aggregates metadata received from the metadata packages using the ten second intervals corresponding to the ten second intervals used by the metadata embedder 135. The example media monitor 165 utilizes crediting rules to, over the course of a period of time (e.g., one minute), determine whether the user and/or the media device should be credited with the presentation of the media. In some examples, the media monitor 165 retrieves a crediting rule configuration file from the central facility 170. The example media monitor 165 aggregates metadata associated with the presented media according to the configuration file (block 625).

In examples disclosed herein, an example crediting rule(s) included in the configuration file indicates that if a threshold number of metadata packages (e.g., three or more metadata packages) are identified within the period of time, the user and/or media device 160 should be credited as having been presented media for the entire minute. Using the crediting rules, the example media monitor 165 aggregates together a series of periods of time (e.g., minutes) to form a segment pattern having portions corresponding to each period of time (e.g., each minute) within the segment. For example, a five minute segment pattern may be represented as "11111" to indicate that media was presented for each of the five minutes within that segment.

In some examples, the media device 160 consults a time shifted viewing (TSV) server to identify, for example, whether time shifted viewing is occurring and, if so, an appropriate time shifted viewing (TSV) code to be used when constructing a segment code. The segment pattern information is combined with other information present at and/or otherwise available to the monitoring functionality and/or the media device to form a segment code. The media monitor 165 constructs one or more monitoring messages representing periods of media presentation. (block 630). The media monitor 165 then transmits the monitoring message(s) to the central facility 170 and/or the database proprietor 180, 182. (block 635).

In examples disclosed herein, the media monitor 165 transmits the monitoring message(s) to both the central facility 170 and the database proprietor 180, 182. However, in some examples, the media monitor 165 may transmit the monitoring message(s) to a first one of the central facility 170 or the database proprietor 180, 182 and subsequently be re-directed to a second one of the central facility 170 or the database proprietor 180, 182. For example, the monitoring message(s) may be transmitted to the central facility 170, and then may be re-directed to the database proprietor 180, 182. In examples disclosed herein, the same example monitoring message(s) are transmitted to both the central facility 170 and the database proprietor 180, 182. However, in some examples, different monitoring message(s) are transmitted to the central facility 170 and the database proprietor 180, 182. For example, monitoring message(s) transmitted to the database proprietor 180, 182 may include additional user-identifying information (e.g., cookies) that are not included in the monitoring message(s) transmitted to the central facility 170.

Upon receipt of the monitoring message(s), the central facility 170 stores the received monitoring message(s). (block 640). Likewise, the example database proprietor 180, 182 stores the received monitoring message(s) (block 642). The example central facility 170 then identifies media properties represented by the media identifying metadata and/or segment codes present in the stored monitoring message(s). (block 645). As used herein, a media property is a property of the media that can be used to describe the media such as, for example an originator of the media (e.g., a broadcaster such as ABC, CBS, NBC, etc.), a program name (e.g., "The Big Bang Theory", "Modern Family", "Family Guy", etc.), a telecast (e.g., "Season 2, Episode 2", "Season 4, Episode 2", etc.), stream information (e.g., information indicating that the stream was live, information indicating that the stream was presented within three days of its initial live broadcast, etc.). In examples disclosed herein, the example central facility 170 identifies an originator, a program, a telecast, a stream, etc. associated with each media identifier and segment code pair. The example central facility 170 constructs a control file that identifies information corresponding to each of the media identifier and segment code pairs. An example control file is described below in connection with FIG. 14. Based on the values in the control file, the database proprietor 180, 182, can report a demographic distribution and/or a unique audience value for a media property using the association of various media identifier and segment code pairs with the media property. The central facility 170 transmits the control file and a request for various aggregations of media properties in connection with the information included in the control file to the database proprietor 180, 182. (block 650).

The database proprietor 180, 182, determines a demographic distribution and a unique audience value for each of the requested aggregations. (block 655). In example disclosed herein, different media properties may be used as filters and/or aggregations when the database proprietor 180, 182 determines the demographic distribution and the unique audience value. The database proprietor 180, 182 reports the determined information to the central facility 170. In some examples, more specific demographic information is determined such as, for example, demographic information corresponding to a particular segment code. Utilizing the segment code enables the database proprietor 180, 182 to prepare more granular demographic information such as, for example, minute-by-minute level demographics of a media stream. Such information may be useful to, for example, determine if a particular event within the streaming media caused a particular demographic segment to terminate the stream.

The example central facility 170 collects minute level demographic information from a broadcast television monitoring system. (block 660). In examples disclosed herein, the example broadcast television monitoring system is operated by the audience measurement entity of the central facility 170. However, the broadcast television monitoring system may be operated by any other entity. The central facility 170 combines the demographic distribution information and the unique audience information received from the database proprietor 180, 182 with the demographic information received from the broadcast television monitoring system to prepare a report. (block 665). In examples disclosed herein, the report may identify, for example, a total size of the viewing audience of an episode, of a telecast, etc.

While the example process 600 of FIG. 6 is illustrated as a serial process, it should be understood that some of the operations of FIG. 6 will be performed in parallel. For example, media devices may continually transmit monitoring messages to the central facility 170 and/or the database proprietor 180, 182. Likewise, the central facility 170 may periodically update the database proprietor 180, 182 with media identifier and segment code pairs to enable accurate media aggregation.

Figure 7:
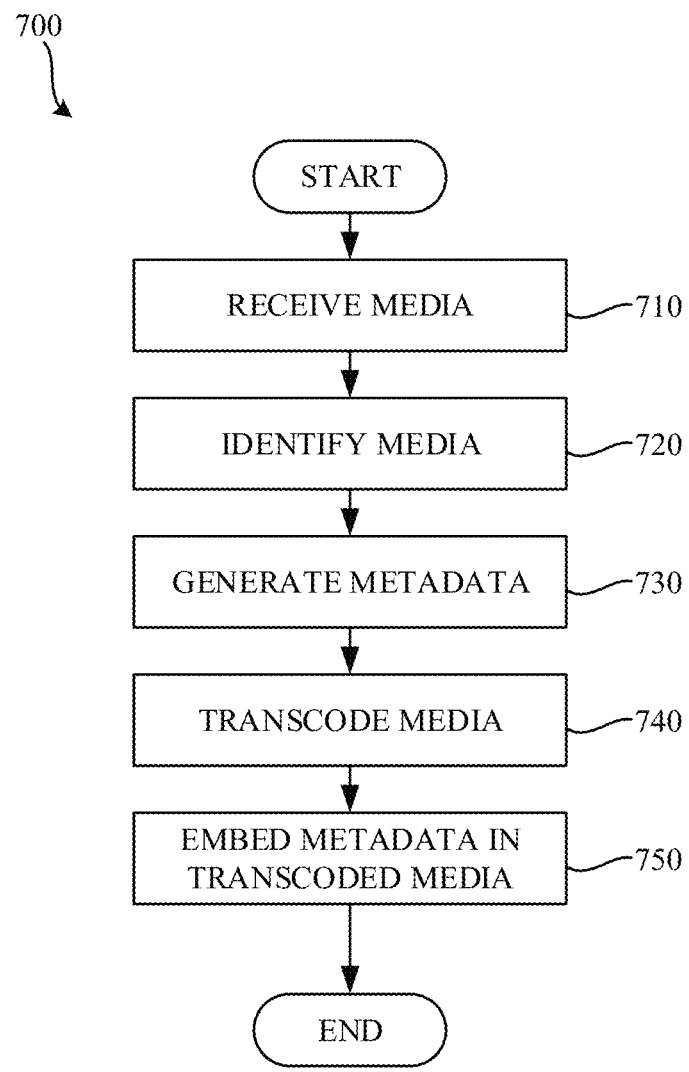
FIG. 7 is a flowchart representative of example machine-readable instructions which may be executed to implement the example service provider of FIG. 1.

FIG. 7 is a flowchart representative of example machine-readable instructions 700 which may be executed to implement the example service provider 120 of FIG. 1. Execution of the example machine-readable instructions 700 of FIG. 7 begins with the media identifier 125 of the service provider 120 receiving the media from the media provider 110 (block 710). In the illustrated example, the media is received as it is broadcast (e.g., live). However, in some examples, the media is stored and/or cached by the media identifier 125.

The media identifier 125 of the illustrated example then identifies the media (block 720). The media identifier 125 identifies the media by extracting metering data (e.g., signatures, watermarks, etc.) from the media. Based on the extracted metering data, the media identifier 125 generates metadata (block 730). In the illustrated example, the metadata is generated in an ID3 format. However, any other metadata format may additionally or alternatively be used. Further, in the illustrated example, the metadata is generated based on the extracted metering data. However, in some examples, the metadata may be generated by querying an external source using some or all of the extracted metering data.

The media is then transcoded by the transcoder 130 of the service provider 120 (block 740). In the illustrated example, the media is transcoded into an MPEG2 transport stream that may be transmitted via HTTP live streaming (HLS). The metadata embedder 135 of the service provider 120 embeds the metadata into the media (block 750). In some examples, the metadata is encrypted prior to being embedded into the media. In the illustrated example, the metadata is embedded into a metadata channel of the media. However, in some examples, the metadata may be embedded in an ancillary data document, file, etc. that may be associated with the media. For example, the metadata may be embedded in a manifest file (e.g., an M3U8 file), in a text track associated with the media, etc.

The media may then be transmitted by the media transmitter 140 of the service provider 120 (see block 615 of FIG. 6). In the illustrated example, the media is transmitted using HTTP live streaming (HLS). However, any other format and/or protocol for transmitting (e.g., broadcasting, unicasting, multicasting, etc.) media may additionally or alternatively be used.

FIG. 8 is a flowchart representative of example machine readable instructions 800 which, when executed, cause the media monitor 165 of FIGS. 1 and/or 3 to aggregate and transmit monitoring information to the central facility 170 and/or the database proprietor 180, 182. The example instructions 800 the illustrated example of FIG. 8 begin when the example media monitor 165 is initialized (block 802). In examples disclosed herein, the example media monitor 165 is initialized when, for example, a webpage including the media monitor is presented at the media device 160. However, the example media monitor 165 may be initialized using any other approach. For example, the example media monitor 165 may be initialized upon launching of an application (e.g., an app on the media device 160).

The example configuration retriever 330 gathers configuration parameters from the central facility 170 (block 805). In examples disclosed herein, the configuration parameters instruct the media monitor 165 as to how media is to be monitored and/or which information is to be reported. For example, the configuration parameters may include segment rules that specify how many media presentation periods (e.g., minutes) are to be included in a segment (e.g., a five-minute period). Further, example configuration parameters may instruct the media monitor to report one minute as having media presented when the media has been presented for a threshold amount of time within that minute (e.g., the media was presented for at least 30 seconds out of the one minute).

The example metadata retriever 310 gathers platform identifier indicating a platform of the media device 160 (block 810). In some examples, the platform identifier may identify that the media device as a mobile device. However, any other type of platform may additionally or alternatively be identified such as, for example, a desktop computer.

The example metadata retriever 310 gathers device type information identifying a type of the media device 160 (block 815). In examples disclosed herein the example device type information may indicate that the media device is a tablet, a smart phone, a portable media player, etc. that is, the device type information provides a finer level of detail than the platform information identified in connection with block 810.

The example metadata retriever 310 determines a placement identifier identifying where the media presenter 162 is presenting media within the media device 160. (block 820). In examples disclosed herein, the example metadata retriever 310 may identify an app in which the media presenter 165 is operating (e.g., an ABC app, a Comcast app, etc.). In some examples, the media presenter 162 may be presenting media within a webpage displayed within a browser. In such an example, the example metadata retriever 310 may identify a universal resource locator (URL) of the website and/or webpage in addition to and/or as an alternative to identifying the browser.

The example metadata retriever 310 gathers operating system version information of the media device 160 (block 825). In examples disclosed herein, the example metadata retriever 310 may identify the operating system as, for example, an Apple iOS® version 6 operating system, and android version for operating system, etc. In some examples, the metadata retriever 310 does not identify a version of the operating system but instead, identifies a name of the operating system such as, for example Apple iOS® (e.g., without the version number).

The example metadata retriever 310 gathers a country code in which the media device 160 is operating (block 830). In examples disclosed herein, the example metadata retriever 310 determines the country code by, for example, determining an Internet protocol (IP) address of the media device 160 and performing a geographic look up based on the IP address. However, any other approach to identifying a country of operation of the media device 160 may additionally or alternatively be used.

The example metadata retriever 310 gathers a media identifier corresponding to media presented by the media presenter 162 (block 845). In examples disclosed herein, the media identifier is extracted from an ID3 tag transmitted as part of and/or in association with the media to the media device 160 by the service provider 120. In some examples, the example metadata retriever 310 interfaces with the media presenter 162 to retrieve the media identifier. However, any approach to gathering the media identifier may additionally or alternatively be used. The example metadata retriever 310 stores the gathered media identifier in the metadata buffer 320 (block 850). In this manner, media identifiers are aggregated until a complete segment can be formed in accordance with the configuration parameters retrieved by the configuration retriever 330 in connection with block 805. The example metadata processor 345 analyzes the media identifiers stored in the metadata buffer 320 to determine whether a complete segment can be reported (block 855). In examples disclosed herein, the example metadata processor 345 determines that a media segment is complete when, for example, five one-minute periods have been sequentially monitored. However, any other approach to determining whether a media segment is complete may additionally or alternatively be used. If media segment is not complete, (block 855 returns a result of NO), the example metadata retriever 310 continues to gather media identifiers (block 845) and aggregate them in the metadata buffer 320 (block 850).

If the media segment is complete, (block 855 returns a result of YES), the example metadata processor 345 determines the segment code to be transmitted in association with the media identifier (block 860). An example approach to determining a segment code to be transmitted is described in further detail in connection with FIG. 9, below. The example metadata processor 345 then constructs one or more monitoring messages to be transmitted to the central facility 170 and/or the database proprietor 180, 182 (block 865). Examples disclosed herein, the media identifier, the segment code, the platform, the device type, the placement identifier, the operating system version information, the country code, etc. are included in the monitoring messages transmitted to the central facility 170 and/or the database proprietor 180, 182. In some examples, additional information media may be transmitted in connection with the monitoring messages such as common sent for example, user identifying information. For example, a cookie identifying the user may be transmitted to the database proprietor 180, 182 to enable the database proprietor 180, 182 to identify the user in connection with the monitoring message. In some examples, the user-identifying information may be included as a part of the monitoring message. For example, the metadata retriever 310 may determine an Identifier for Advertising (IDFA), an Advertising ID (AAID), etc. that is used to identify the user.

Examples disclosed herein, a monitoring message is transmitted for each unique media identifier stored in the metadata buffer 320. When, for example, multiple media identifiers identifying the same media are stored in them metadata buffer 320, instead of transmitting multiple messages to the central facility 170 and/or the database proprietor 180, 182, the example metadata processor 345 reduces the amount of network communications by transmitting a single monitoring message for that media identifier. As a result, bandwidth utilized by the media device 160 is conserved, while retaining the ability to provide minute by minute media monitoring information via use of the segment code.

The example metadata processor 345 then transmits the monitoring messages via the network communicator 350 to the central facility 170 and/or the database proprietor 180, 182 (block 870). In examples disclosed herein, the example monitoring messages are transmitted as HTTP messages. However, any other past, present, and/or future message format may additionally or alternatively be used. Upon receipt of an acknowledgment of the monitoring message, the example metadata processor 345 clears the metadata buffer 320 (block 875). The example metadata retriever 310 then continues to gather media identifiers from the media and aggregate those media identifiers in the metadata buffer 320 for subsequent transmission in monitoring messages.

Figure 9:
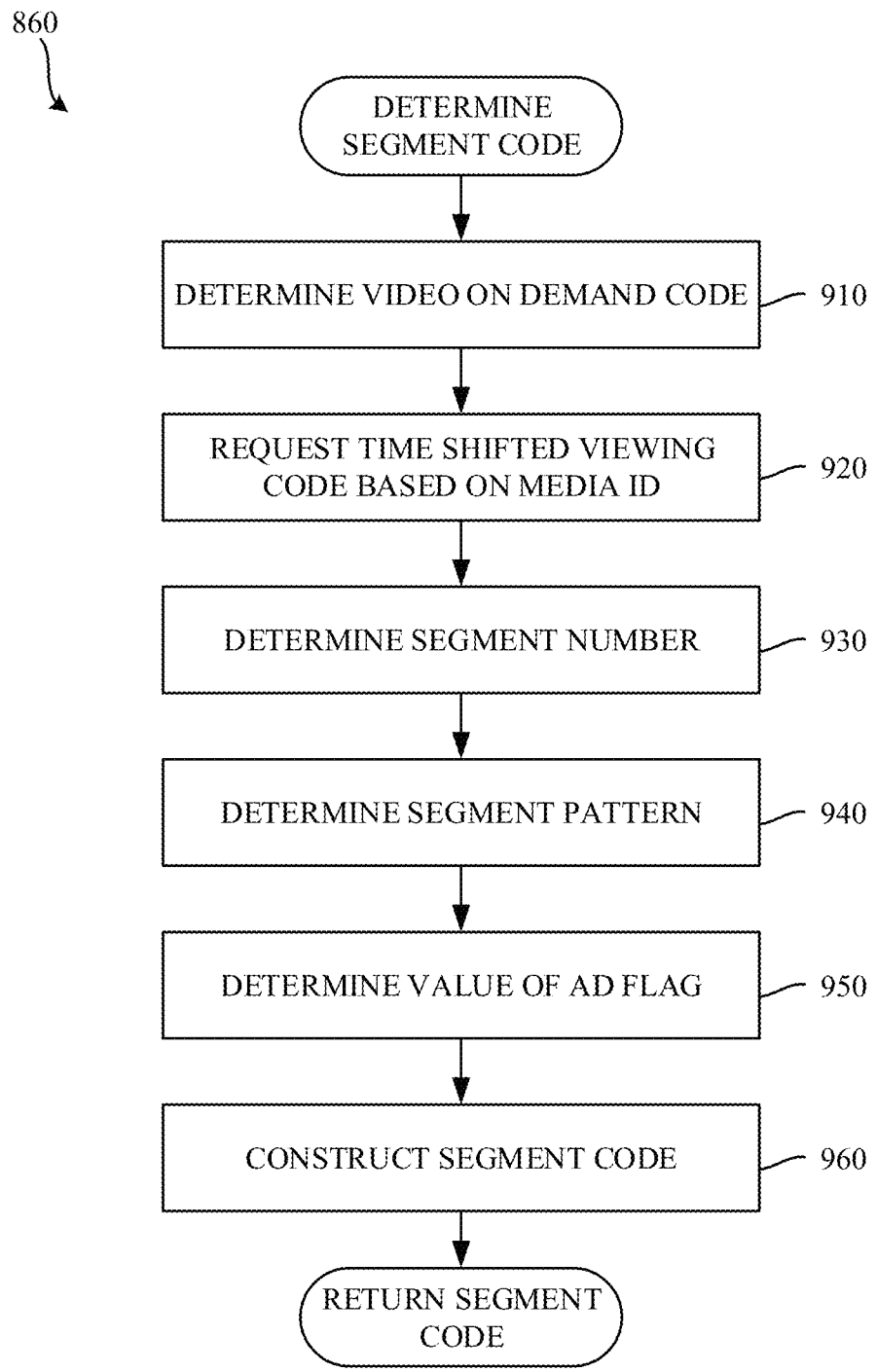
FIG. 9 is a flowchart representative of example machine readable instructions which, when executed, cause the media monitor of FIGS. 1 and/or 3 to determine a segment code to be transmitted to the central facility and/or the database proprietor.

FIG. 9 is a flowchart representative of example machine readable instructions 860 which, when executed, cause the media device 160 of FIGS. 1 and/or 3 to determine a segment code to be transmitted to the central facility 170 and/or the database proprietor 180, 182. The example instructions 860 of FIG. 9 begin when the example metadata processor 345 determines a video-on-demand code based on whether the media is detected to be live streaming. (block 910).

The example time shifted viewing code retriever 340 requests a time shifted viewing code from the example TSV analyzer 430 of the example central facility 170. (block 920). The request for the TSV code includes a media identifier that can be used to identify the presented media. In examples disclosed herein, an example media identifier includes a station identifier and a timestamp. An example approach for determining the time shifted viewing code at the TSV analyzer 430 is described in further detail in connection with FIG. 10.

The example metadata processor 345 then determines a segment number to be used when constructing the segment code. Block 930. Examples disclosed herein, the segment number is determined by dividing a difference between the current time and a time of the beginning of the day by the duration of a segment. Examples disclosed herein the time of the beginning of the day is considered to be three AM local time, as this represents the start of a broadcast day. However, any other time may additionally or alternatively be used.

In examples disclosed herein, the duration of the segment is five minutes however, any other duration may additionally or alternatively be used. The duration information is retrieved by the configuration retriever 330 in connection with block 805 of FIG. 8. Examples disclosed herein, the segment number is represented in an integer format. However, any other format may additionally or alternatively be used. For example, a period of time from 1:25 PM to 1:30 PM is represented with a segment number of "125". In some examples, the segment number may be proceeded by an identifier indicating a type of the segment number. For example, the identifier may be the character "D" indicating that the segment is a duration segment. In some other examples, the character "Q" may be used to indicate that the segment represents a quarter hour duration.

In some examples, the segment number may represent a segment within the media itself, as opposed to a time of day. For example, a segment number of 3 may be used to represent a period of time from the $15^{th}$ minute of the media to the $20^{th}$ minute of the media.

The example metadata processor 345 determines a segment pattern (block 940). In examples disclosed herein, the segment pattern follows the format "abcde", where the terms a, b, c, d, and e refer to respective ones of 1st, 2nd, 3rd, 4th, and 5th sub-segments (e.g., minutes) of a segment. A value "0" in any of the terms a, b, c, d, e indicates that the media was not presented during corresponding sub-segment (e.g., the corresponding minute) and the value "1" indicates that the media was presented during the corresponding sub-segment (e.g., the corresponding minute) was presented. In some examples, the media is considered to be presented within the corresponding minute when it was presented for more than a threshold duration within that minute (e.g., more than thirty seconds within the minute). Thus, a segment pattern of "01010" indicates that, of a second time segment of the media (of n time segments making up the media), the media was presented during the 2nd and 4th sub-segments, but was not presented during the 1st, 3rd, and 5th sub-segments.

The example metadata processor 345 determines a value of an advertisement flag. (block 950). The advertisement flag indicates whether an advertisement was displayed during the media segment and, if so, a type of advertisement displayed (e.g., a linear advertisement or a dynamic advertisement). The example metadata processor 345 then constructs the segment code using the video on demand code (e.g., the video on demand code determined in connection with block 910), the time shifted viewing code (e.g., the time shifted viewing code determined in connection with block 920), the segment number (e.g., the segment number determined in connection with block 930), the segment pattern (e.g., the segment pattern determined in connection with block 940), the advertisement flag (e.g., the advertisement flag determined in connection with block 950) (block 960). In examples disclosed herein, the segment code is constructed using a delimiter intermediate each of the video on demand code, the time shifted viewing code, the segment number, the segment pattern, and the advertisement flag. In examples disclosed herein, the delimiter is an underscore "_". However, any other delimiter may additionally or alternatively be used. Furthermore, in some examples, other approaches to transmitting multiple pieces of data as a single segment code may additionally or alternatively be used. The segment code is then returned and, in the context of FIG. 8, the metadata processor 345 continues with constructing monitoring message(s) 865 including the media identifier and the corresponding segment code.

FIG. 10 is a flowchart representative of example machine readable instructions which, when executed, cause the central facility 170 to provide a time shifted viewing code in response to a request for a time shifted viewing code from the media device 160. The example instructions of FIG. 10 begin when the example TSV analyzer 430 receives a request for a TSV code from the media monitor 165. As noted above in connection with FIG. 9, the request for the TSV code includes the media identifier (including a station identifier and a timestamp). Requests for TSV codes are received while media is being presented and include a media identifier of the presented media. However, in some examples, the media being presented may be time shifted from its initial time of broadcast and/or distribution. The example TSV analyzer 430 sets a viewing time to the current time of the central facility 170. (block 1005).

The TSV analyzer 430 then determines a type of station identifier included in the received media identifier. (block 1010). As noted above, in some examples, the media identifier is a program content (PC) encoding watermark. PC encoding watermarks are inserted by media creators such as, for example, TV networks and/or TV syndicators (e.g., the example media provider 110 of FIG. 1). In some examples, the media identifier is a final distribution (FD) encoding watermark. FD encoding watermarks are inserted by service providers such as, for example, Comcast, DirecTV, Dish Network, Time Warner, etc. (e.g., the example service provider 120 of FIG. 1). If the TSV analyzer 430 is unable to determine the type of station identifier included in the media identifier (block 1010 returns a result of "OTHER"), the TSV analyzer 430 sets the TSV code to a value indicating that the time shifting status of the media presentation is unknown (block 1015). The TSV analyzer 430 then returns the TSV code to the media monitor 165. (block 1020). The TSV code is then subsequently included in a segment code that is reported to the central facility 170 and/or the database proprietor 180, 182.

Returning to block 1010, if the example TSV analyzer 430 determines that the media identifier is an FD watermark, the example TSV analyzer 430 determines the timestamp used in the media identifier, and sets a distribution time equal to the timestamp. (block 1030). The example TSV analyzer 430 determines whether a difference between the viewing time (determined in connection with block 1005) and the distribution time (determined in connection with block 1030) is less than or equal to about two minutes. (block 1035). If the time difference between the viewing time and the distribution time is less than about two minutes, the media is considered to be live media. As used herein, the term "about" is expressly defined to mean within three percent of the stated value. In the illustrated example, a threshold of about two minutes is used. However, any other time threshold may additionally or alternatively be used to determine whether the media is being presented in a live fashion. For example, a threshold of thirty seconds might be used to determine if the media is live media.

If the difference between the viewing time and the distribution time is less than or equal to two minutes (block 1035 returns a result of YES), the example TSV analyzer 430 sets the TSV code to indicate that the media is being presented in a live fashion (block 1045). The TSV analyzer 430 then returns the TSV code to the media monitor 165 via the network communicator 171 (block 1020).

If the difference between the viewing time and the distribution time is not less than or equal to two minutes (block 1035 returns a result of NO), the example TSV analyzer 430 computes a TSV code based on the difference between the distribution time and the viewing time. (block 1040). In examples disclosed herein, the TSV analyzer 430 determines the TSV code by performing a lookup based on the difference in minutes. An example lookup table is shown below in Table 1. The example Table 1 includes low and high duration boundaries, a description of what is identified by the boundaries, and a corresponding TSV code.

TABLE 1

| Low Duration Boundary (minutes) | High Duration Boundary (minutes) | Description | TSV code |
|---|---|---|---|
| 0 | 2 | Live | 00 |
| Same Day | Same Day | Same day playback | 01 |
| 3 | 1620 | $1^{st}$ day playback, excluding same day | 02 |
| 1621 | 3060 | $2^{nd}$ day playback | 03 |
| 3061 | 4500 | $3^{rd}$ day playback | 04 |
| 4501 | 5940 | $4^{th}$ day playback | 05 |
| 5941 | 7380 | $5^{th}$ day playback | 06 |
| 7381 | 8820 | $6^{th}$ day playback | 07 |
| 8821 | 10080 | $7^{th}$ day playback | 08 |
| 10081 | | $8^{th}$ day and beyond playback | 90 |
| | | Default/unknown | 99 |

In the example Table 1 above, some of the boundaries are shifted by about 3 hours (180 minutes) from even day boundaries (e.g., 24 hours, 48 hours, 72 hours, etc.). Such shifting results in media that was presented within about 27 hours of its initial distribution being considered presented during the first day of playback. As used herein, the term "about" is expressly defined to mean within three percent of the stated value. In examples disclosed herein, three hours is used as most broadcast media does not exceed three hours in duration. However, any other the boundaries may additionally or alternatively be shifted by any other value.

As shown in the example Table 1 above, in some examples, the example TSV analyzer 430 may determine whether the viewing time and the distribution time represent a same day. In such an example, a separate TSV code may be determined (e.g., the TSV code "01" in Table 1) as opposed to a TSV code indicating that the media was presented within one day of its initial distribution. For example, the distribution time may indicate that the media was distributed at 7 PM, and the viewing time may be 8 PM on the same day. In such an example, the media was not presented live, but was presented on the same day, and the TSV code is determined to be "01" per table 1. In contrast, if the distribution time was 7 PM, and the viewing time was 4 PM the next day, the duration would have been less than 24 hours, but not presented on the same day, and therefore would receive a TSV code of "02".

In some examples, the TSV analyzer 430 may not be able to determine a TSV code because, for example, the distribution timestamp was corrupted. In such an example, the example TSV analyzer 430 may set the TSV code to a value representing an unknown TSV code (e.g., a value of "$_{99}$")

While in the illustrated example of FIG. 10 a lookup table is used to determine the TSV code, any other approach to determining a TSV code may additionally or alternatively be used such as, for example, by determining a number of day boundaries that have passed intermediate the distribution time and the viewing time.

Upon determining the TSV code, the example TSV analyzer 430 returns the TSV code to the media monitor 165 via the network communicator 171 (block 1020).

Returning to block 1010, if the TSV analyzer 430 determines that the type of the station identifier indicates that the media identifier is a PC encoding watermark (block 1010 returns a result of PC), the example TSV analyzer identifies a type of timestamp encoding used in the media identifier. (block 1050). In some examples, the timestamp encoding is a sequence based encoding. Sequence encoded watermarks use the timestamp to represent a time within the media (e.g., ten minutes into the media, fifteen minutes into the media, etc.) and, in some examples, can be used to identify the media, but do not identify when the media was initially distributed. As a result, Sequence encoded watermarks cannot be used to accurately determine a TSV code. Sequence based encoding may be detected by identifying that the timestamp does not include a date component (e.g., a year, a month, a day, etc.). If Sequence based encoding is detected (block 1050 returns a result of "SEQUENCE BASED"), the example TSV analyzer 430 sets the TSV code to a value indicating that the time shifting status of the media presentation is unknown (block 1015). The TSV analyzer 430 then returns the TSV code to the media monitor 165. (block 1020).

In some examples, the timestamp encoding is a distribution based encoding. Distribution based encoding sets the timestamp to the time of distribution of the media. In some examples, Time In Content (TIC) based encoding may additionally or alternatively be used. Distribution based encoding may be detected based on the presence of a date component (e.g., a year, a month, a day, etc.) within the timestamp. Distribution based encoding is detected (block 1050 returns a result of "DISTRIBUTION BASED"), the example TSV analyzer 430 sets the distribution time equal to the time detected in the PC encoded timestamp (block 1055).

The example TSV analyzer 430 determines whether a difference between the viewing time (determined in connection with block 1005) and the distribution time (determined in connection with block 1055) is less than or equal to two minutes. (block 1060). If the time difference between the viewing time and the distribution time is less than two minutes, the media is considered to be live media, and the example TSV analyzer 430 sets the TSV code to indicate that the media is being presented in a live fashion (block 1045). The TSV analyzer 430 then returns the TSV code to the media monitor 165 via the network communicator 171 (block 1020).

Returning to block 1060, if the difference between the viewing time in the distribution time is not less than or equal to two minutes (e.g., block 1060 returns result of NO), the example TSV analyzer determines whether the station identified by the station identifier utilizes live encoding (block 1065). Live encoding is used when, for example, the timestamp is set at the time of distribution. If live encoding is used (block 1065 returns a result of YES), the example TSV analyzer 430 computes a TSV code based on the difference between the distribution time and the viewing time (block 1040), and returns the computed TSV code to the media monitor 165 (block 1020). If live encoding is not used (block 1065 returns a result of NO), the example TSV analyzer 430 sets the TSV code to a value indicating that the time shifting status of the media presentation is unknown (block 1015). The TSV analyzer 430 then returns the TSV code to the media monitor 165. (block 1020).

FIG. 11 is a flowchart representative of example machine readable instructions which, when executed, cause the database proprietor 180, 182 to receive a monitoring message from the media device 160 of FIG. 1. Execution of the example machine-readable instructions 1100 of FIG. 11 begins when the monitoring data receiver 540 of the database proprietor 180 of FIG. 5 determines whether a monitoring message has been received from the media monitor 165 at the network communicator 510. (block 1110). The monitoring message includes media identifying metadata (e.g., a media identifier, a segment code, etc.), media presentation information, and may additionally include user-identifying data. If no message has been received (block 1110 returns a result of NO), the example monitoring data receiver 540 waits for a monitoring message to be received (block 1110).

If a monitoring message has been received (block 1110 returns a result of YES), the example monitoring data receiver 540 extracts media identifying metadata from the received monitoring message (block 1120). The example monitoring data receiver 540 extracts media presentation information from the received monitoring message (block 1130). The example monitoring data receiver 540 extracts user identifying metadata from the received monitoring message (block 1140). The extracted information is stored in the metadata database 560 by the monitoring data receiver 540 (block 1150). The example process is then repeated to receive subsequent monitoring messages from the media monitor 165.

FIG. 12 is a flowchart representative of example machine readable instructions which, when executed, cause the central facility 170 to receive a monitoring message from the media monitor 165 of FIG. 1. Execution of the example machine-readable instructions 1200 of FIG. 12 begins when the metadata handler 440 of the central facility 170 of FIG. 4 determines whether a monitoring message has been received from the media monitor 165 at the network communicator 171. (block 1210). The monitoring message includes media identifying metadata (e.g., a media identifier, a segment code, etc.), media presentation information, and may additionally include user-identifying data. If no message has been received (block 1210 returns a result of NO), the example metadata handler 440 waits for a monitoring message to be received (block 1210).

If a monitoring message has been received (block 1210 returns a result of YES), the example metadata handler 440 extracts media identifying metadata (e.g., a media identifier, a segment identifier, etc.) from the received monitoring message (block 1220). The extracted information is stored in the metadata database 450 by the metadata handler 440 (block 1230). The example process is then repeated to receive subsequent monitoring messages from the media monitor 165.

Figure 13:
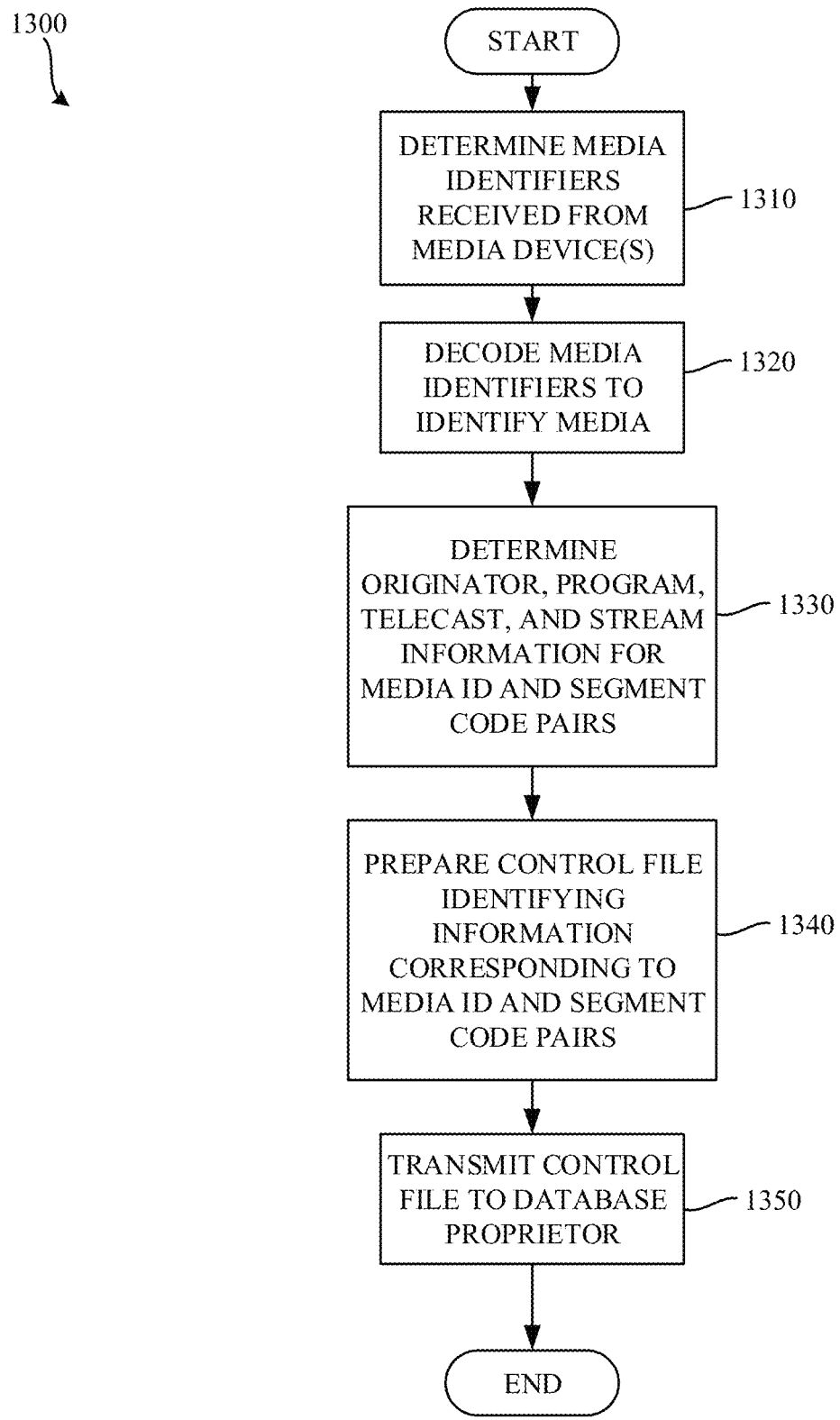
FIG. 13 is a flowchart representative of example machine readable instructions which, when executed, cause the example central facility to construct and transmit a control file identifying information corresponding to media ID and segment code pairs to the database proprietor.

FIG. 13 is a flowchart representative of example machine readable instructions which, when executed, cause the example central facility 170 to construct and transmit a control file identifying information corresponding to media ID and segment code pairs to the database proprietor 180, 182. The example instructions of FIG. 11 begin when the example metadata handler 440 determines media identifiers received from the media monitor(s) 165. (block 1310). In example disclosed herein, the example metadata handler 440 determines media identifiers received from the media devices. (block 1310). As described in connection with FIG. 12, the example metadata handler 440 stores the media identifiers in the example metadata database 450. The example metadata handler 440 queries the database to determine any media identifiers for which an identity of the media is not known. In examples disclosed herein, the media identifier is encoded and/or encrypted to prevent parties other than the Audience Measurement Entity (AME) operating the central facility 170 from affirmatively identifying the presented media. The example metadata handler 440 decodes the media identifier to identify the media. (block 1320). In some examples, the media identifier may additionally or alternatively be decrypted to facilitate identification of the media.

As discussed above in connections with FIG. 8, monitoring messages include the media identifier and a segment code. The example metadata handler 440 performs a lookup to identify an originator, a program, a telecast, and/or a stream for media ID and segment code pairs. (block 1330). The correspondence of the media identifier and segment code pairs to various originators, programs, telecasts, streams, etc., when provided to the database proprietor 180, 182, enables summarization and/or aggregation of demographic information in association with an originator, a program, a telecast, a stream, and/or any combination thereof. The example database proprietor interface 460 creates a control file including information corresponding to the media identifier and segment code pairs. (block 1340). An example control file is shown in the illustrated example of FIG. 14. The example database proprietor interface 460 transmits the control file to the database proprietor 180, 182. (block 1350). In examples disclosed herein, the control file is transmitted using a file transfer protocol (FTP). However, any other past, present, and/or future protocol for transmitting a control file may additionally or alternatively be used.

The example process 1300 of FIG. 13 is repeated periodically to provide identifying information corresponding to media identifier and segment code pairs to the database proprietor 180, 182. In examples disclosed herein, the example process 1300 is repeated every three hours to correspond to a periodicity of reports that are generated by the database proprietor. However, the example process 1300 of FIG. 13 may be repeated at any other frequency. Moreover, in some examples, the example process 1300 of FIG. 13 may additionally or alternatively be performed in an a-periodic fashion. For example, the example process 1300 of FIG. 13 may be performed upon receipt of a threshold number of monitoring messages.

FIG. 14 is an example data table representing an example control file 1400 that may be sent from the central facility 170 to the database proprietor 180, 182. In the illustrated example of FIG. 14, the example control file 1400 is represented in a tabular format. However, any other format and/or data structure may additionally or alternatively be used to represent the information contained in the example control file such as, for example, a JavaScript Object Notation (JSON) file, a comma separated value (CSV) file, a structured query language (SQL) structure, etc. The example control file 1400 of FIG. 14 includes a media identifier column 1405, a segment code column 1410, an originator column 1415, a program column 1420, a telecast column 1425, and a stream column 1430.

In examples disclosed herein, the originator column 1415, the program column 1420, the telecast column 1425, and the stream column 1430 represent properties of the media that can be used to describe the media and/or information associated with the media. For example, the example originator column 1415 of the illustrated example of FIG. 14 includes information used to identify the originator of the media such as, for example, a broadcaster, a publisher, etc. The example program column 1420 of the illustrated example of FIG. 14 is used to identify a name of the program (e.g., "The Big Bang Theory", "Modern Family", "Family Guy", etc.). The example telecast column 1425 of the illustrated example of FIG. 14 includes information used to identify the season and/or episode of the program. The example stream column 1430 includes information used to identify a type of stream of the media such as, for example, whether the stream was live, delayed, etc.

While in the illustrated example of FIG. 14 four media properties (i.e., the originator, the program, the telecast, and the stream) are identified, any other media properties may additionally or alternatively be identified in connection with the media identifier and segment code pair. By including such media properties in the control file, the media identifier and segment code pair can be grouped and/or aggregated by the database proprietor to provide various aggregations of demographic information.

In the illustrated example of FIG. 14, the media properties are identified in clear text. That is, the originator column 1415, the program column 1420, the telecast column 1425, and the example stream column 1430 are used to convey text information corresponding to the originator, the program, the telecast, the stream, etc. However, in some example, the information identifying the media property may be encrypted and/or encoded to prevent parties other than the audience measurement entity from understanding the correlation of a media identifier and segment code pair to a given media property. For example, instead of identifying the program "Modern Family", the example control file 1400 might instead identify the program as "1A8F2CDE". Thus, while a party utilizing the control file might be able to identify that multiple media identifier and segment code pairs correspond to a same program (e.g., the program "1A8F2CDE"), the third party will not be able to identify that program as "Modern Family." When preparing a report, the central facility 170 might decrypt and/or un-encode the encoded and/or encrypted identifier to facilitate identification of the program.

The example control file 1400 of FIG. 14 includes four example rows 1450, 1455, 1460, 1465. While four example rows are shown in the illustrated example of FIG. 14, it should be understood that, in practice, many additional rows corresponding to many additional media identifier and segment code pairs will be used.

Figure 15:
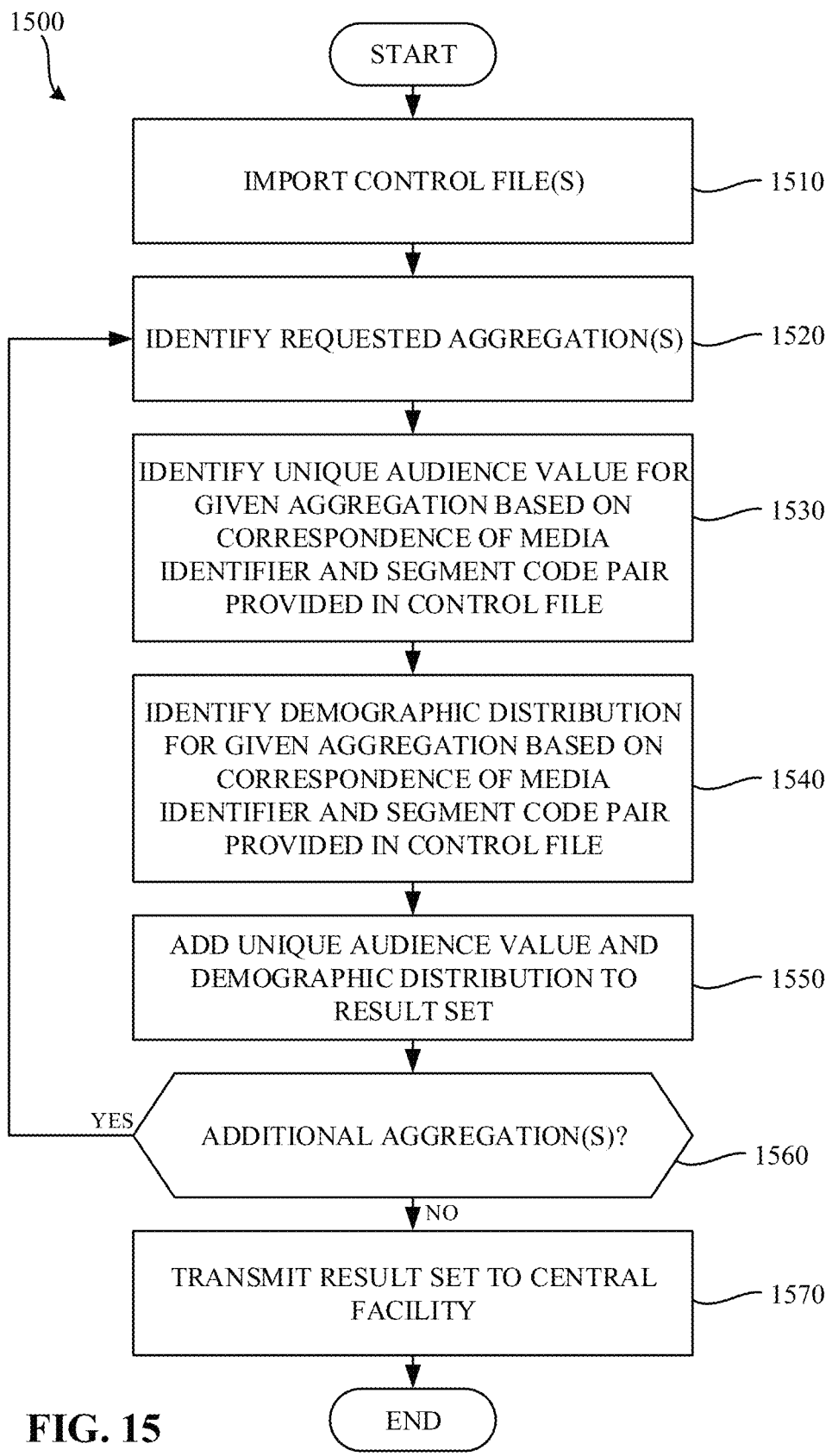
FIG. 15 is a flowchart representative of example machine readable instructions which, when executed, cause the database proprietor to prepare a unique audience total and demographic distribution according to the control file and requested aggregations provided by the central facility.

FIG. 15 is a flowchart representative of example machine readable instructions which, when executed, cause the database proprietor 180, 182 to prepare a unique audience total and demographic distribution according to the control file and requested aggregations provided by the central facility 170. The example instructions 1500 of FIG. 15 are executed periodically (e.g., every three hours, every day, etc.) to provide updated values representing unique audience totals and demographic distributions to the central facility 170. However, the example instructions 1500 of FIG. 15 may be executed a-periodically such as, for example, in response to a request. The example instructions of FIG. 15 begin when the example central facility request handler 570 imports the control file(s) received from the central facility 170. (block 1510). In the illustrated example of FIG. 15, the control files are imported into the example metadata database 560 to facilitate aggregation and or grouping based on media properties identified in connection with media identifier and segment code pairs by the central facility 170.

The example central facility request handler 570 identifies aggregations for which unique audience value(s) and/or demographic distributions are to be provided to the central facility. (block 1520). Example aggregations that might be identified include, for example, an aggregation by originator, program, telecast, stream, country, media platform, and/or any combination thereof. For example, an aggregation to be prepared might include information specific to (e.g., filtered to) a particular telecast (e.g., "Season 4, Episode 2") of a particular program (e.g., "Modern Family").

Moreover, in some examples, the central facility request handler 570 may use pattern matching to group segment codes together. For example, pattern matching may be used to match media impressions corresponding to a same media identifier but different (but similar) segment codes. For example, both the segment code "2_00_00_D1_11111" and "2_00_00_D1_00001" indicate that the identified media was presented during a fifth minute of a five minute segment (as indicated by the binary 1 in the last character position of each segment code). As such, pattern matching (e.g., a regular expression) may be used to gather demographic information associated with impression records corresponding to a media identifier and having a segment code matching a particular pattern (e.g., a pattern ending in a binary 1 to match the fifth minute of the five minute segment). In some examples, the segment code of the media identifier and segment code pair utilizes wildcards to identify where pattern matching is to be used (e.g., "2_00_00_D1_****1" where "*" indicates either a one or a zero).

The example central facility request handler 570 identifies a unique audience value for the selected aggregation based on the correspondence of the media identifier and segment code pair(s) provided in the control file. (block 1530). In some examples, the example central facility request handler 570 identifies the unique audience value by counting the number of unique user identifiers recorded in connection with media identifier and segment code pairs that match filter parameters of the selected aggregation. However, any other approach to determining a unique audience value may additionally or alternatively be used.

The example central facility request handler 570 identifies a demographic distribution for the selected aggregation based on the correspondence of the media identifier and segment code pair(s) provided in the control file. (block 1540). In some examples, the example central facility request handler 570 identifies the demographic distribution by reporting aggregated demographic information (e.g., summarizations of demographic information, averages of demographic information, etc.) corresponding to user identifiers recorded in connection with media identifier and segment code pairs that match filter parameters of the selected aggregation. However, any other approach to determining a demographic distribution may additionally or alternatively be used.

The example unique audience value and demographic distribution information are added to a result set in association with an identifier of the selected aggregation. (block 1550). As such, unique audience values and demographic distributions can be reported at various levels of aggregation (e.g., how many users watched "Season 4, Episode 2" of "Modern Family" live versus how many users watched "Season 4, Episode 2" of "Modern Family" on the third day after its initial broadcast and/or distribution, etc.). In examples disclosed herein, the result set enables multiple aggregations to be combined for reported at once. However, in some examples, the aggregations might be reported individually (e.g., in separate transmissions) to the central facility 170.

The example central facility request handler 570 determines whether any additional aggregations are to be reported. (block 1560). If additional aggregations are to be reported (block 1560 returns a result of YES), the example process of blocks 1520 through 1560 is repeated until no additional aggregations are to be reported (block 1560 returns a result of NO). The example central facility request handler 570 then transmits the result set to the central facility 170. (block 1570). With respect to the overall process described in connection with FIG. 6, the example central facility 170 can then combine the unique audience information and demographic distribution information received from the database proprietor 180, 182 with information received from a television monitoring system to calculate overall media presentation metrics (e.g., metrics describing both streaming and broadcast media viewership).

Figure 16:
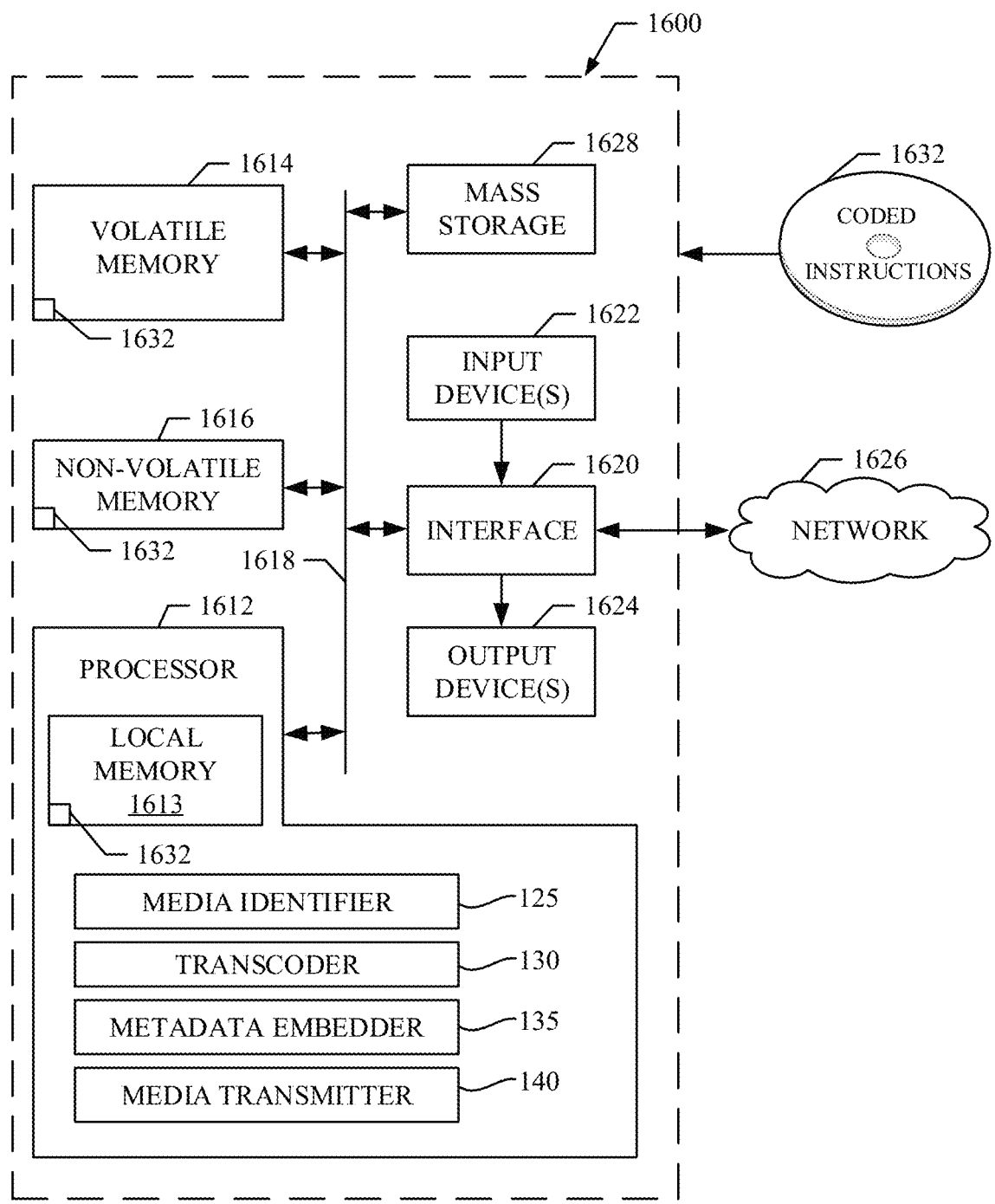
FIG. 16 is a block diagram of an example processor platform capable of executing the instructions of FIG. 7 to implement the example service provider of FIG. 1.

FIG. 16 is a block diagram of an example processor platform 1600 capable of executing the instructions of FIGS. 6 and/or 7 to implement the example service provider 120 of FIG. 1. The processor platform 1600 can be, for example, a server, a personal computer, an Internet appliance, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes a local memory 1613 (e.g., a cache), and executes instructions to implement the example media identifier 125, the example transcoder 130, the example metadata embedder 135, and the example media transmitter 140 of FIG. 1. The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and digital versatile disk (DVD) drives.

The coded instructions 1632 of FIGS. 6 and/or 7 may be stored in the mass storage device 1628, in the volatile memory 1614, in the non-volatile memory 1616, and/or on a removable tangible computer readable storage medium such as a CD or DVD.

Figure 17:
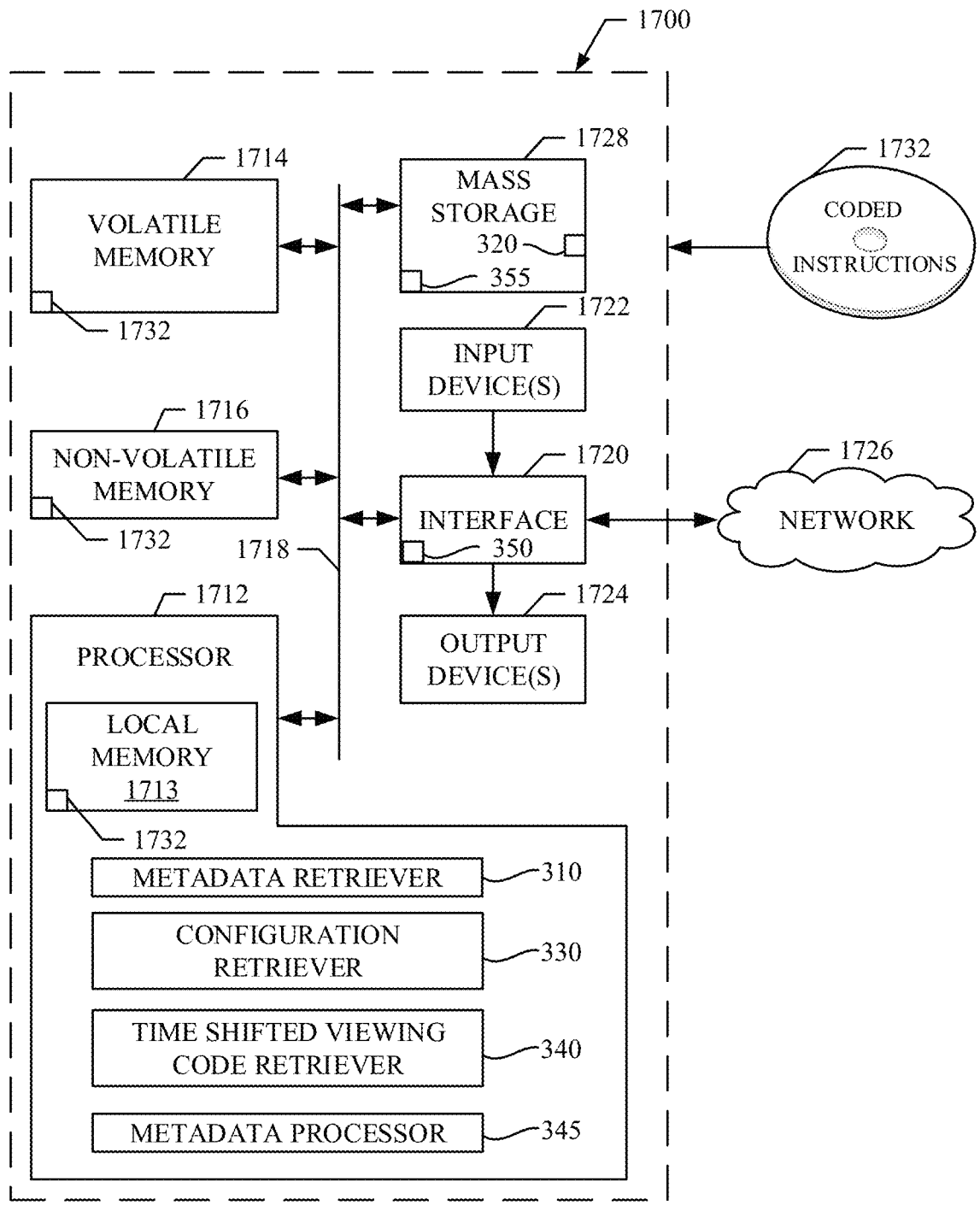
FIG. 17 is a block diagram of an example processor platform capable of executing the instructions of FIGS. 8 and/or 9 to implement the example media monitor of FIGS. 1 and/or 3.

FIG. 17 is a block diagram of an example processor platform 1700 capable of executing the instructions of FIGS. 6, 8, and/or 9 to implement the example media monitor 165 of FIGS. 1 and/or 3. The processor platform 1700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer.

The processor 1712 of the illustrated example includes a local memory 1713 (e.g., a cache), and executes instructions to implement the example metadata retriever 310, the example configuration retriever 330, the example time shifted viewing code retriever 340, and the example metadata processor 345 of FIG. 4. The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface. In some examples, the example interface circuit 1720 implements the example network communicator 350.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and digital versatile disk (DVD) drives. In some examples, the example mass storage devices 1728 implement the example metadata buffer 320 and/or the example user identifying information store 355.

The coded instructions 1732 of FIGS. 6, 8, and/or 9 may be stored in the mass storage device 1728, in the volatile memory 1714, in the non-volatile memory 1716, and/or on a removable tangible computer readable storage medium such as a CD or DVD.

Figure 18:
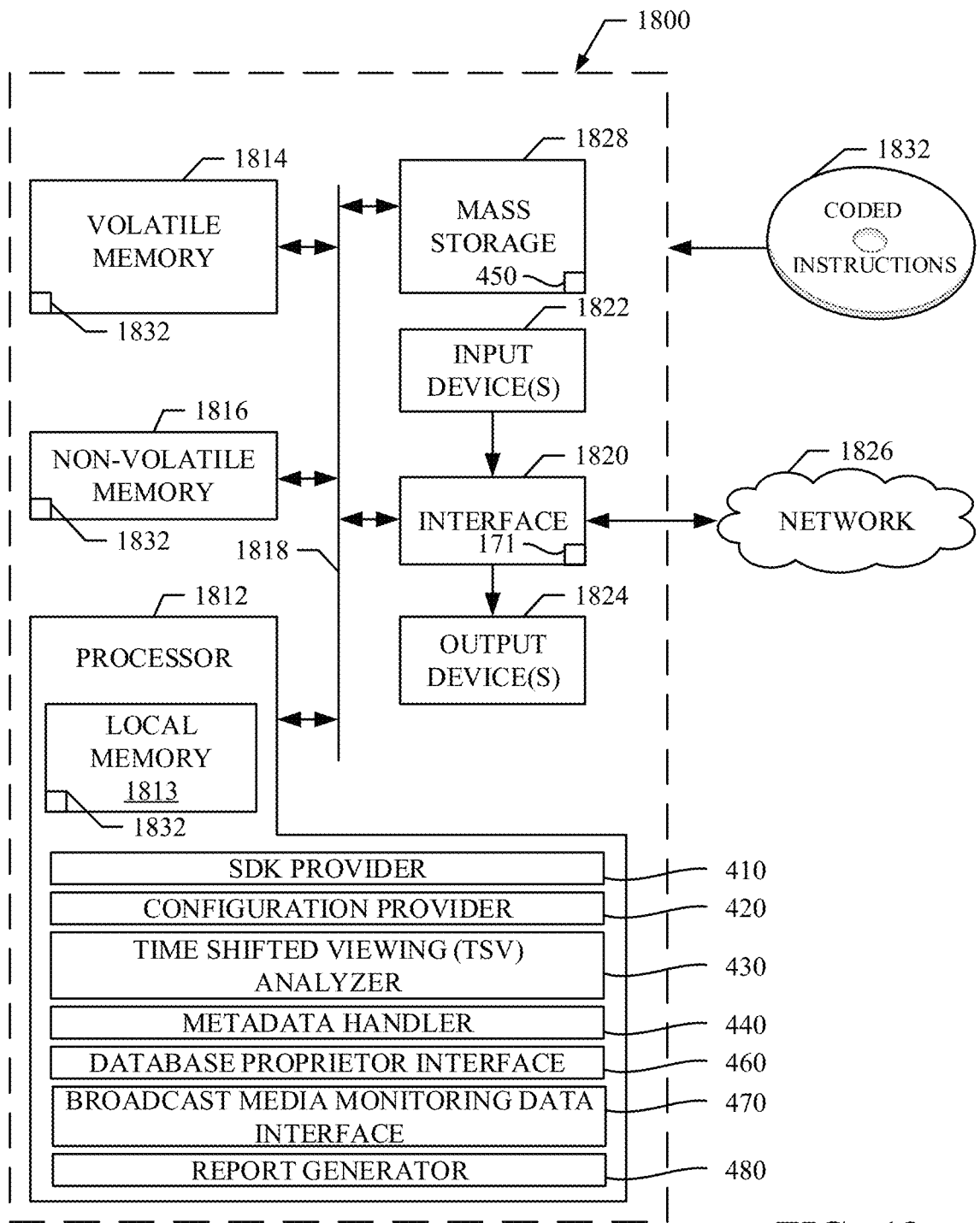
FIG. 18 is a block diagram of an example processor platform capable of executing the instructions of FIGS. 10, 12, and/or 13 to implement the example central facility of FIGS. 1 and/or 4.

FIG. 18 is a block diagram of an example processor platform 1800 capable of executing the instructions of FIGS. 6, 10, 12, and/or 13 to implement the example central facility 170 of FIGS. 1 and/or 4. The processor platform 1800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors or controllers from any desired family or manufacturer.

The processor 1812 of the illustrated example includes a local memory 1813 (e.g., a cache), and executes instructions to implement the example SDK provider 410, the example configuration provider 430, the example TSV analyzer 430, the example metadata handler 440, the example database proprietor interface 460, the example broadcast media monitoring data interface 470, and the example report generator 480. The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), and/or a PCI express interface. In some examples, the example interface 1820 implements the example network communicator 171.

In the illustrated example, one or more input devices 1822 are connected to the interface circuit 1820. The input device(s) 1822 permit(s) a user to enter data and commands into the processor 1812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1820 of the illustrated example, thus, typically includes a graphics driver card, a graphics driver chip or a graphics driver processor.

The interface circuit 1820 of the illustrated example also includes a communication device such as a transmitter, a receiver, a transceiver, a modem and/or network interface card to facilitate exchange of data with external machines (e.g., computing devices of any kind) via a network 1826 (e.g., an Ethernet connection, a digital subscriber line (DSL), a telephone line, coaxial cable, a cellular telephone system, etc.).

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, RAID systems, and digital versatile disk (DVD) drives. The example mass storage devices 1828 may implement the example metadata database 450.

The coded instructions 1832 of FIGS. 6, 10, 12, and/or 13 may be stored in the mass storage device 1828, in the volatile memory 1814, in the non-volatile memory 1816, and/or on a removable tangible computer readable storage medium such as a CD or DVD.

Figure 19:
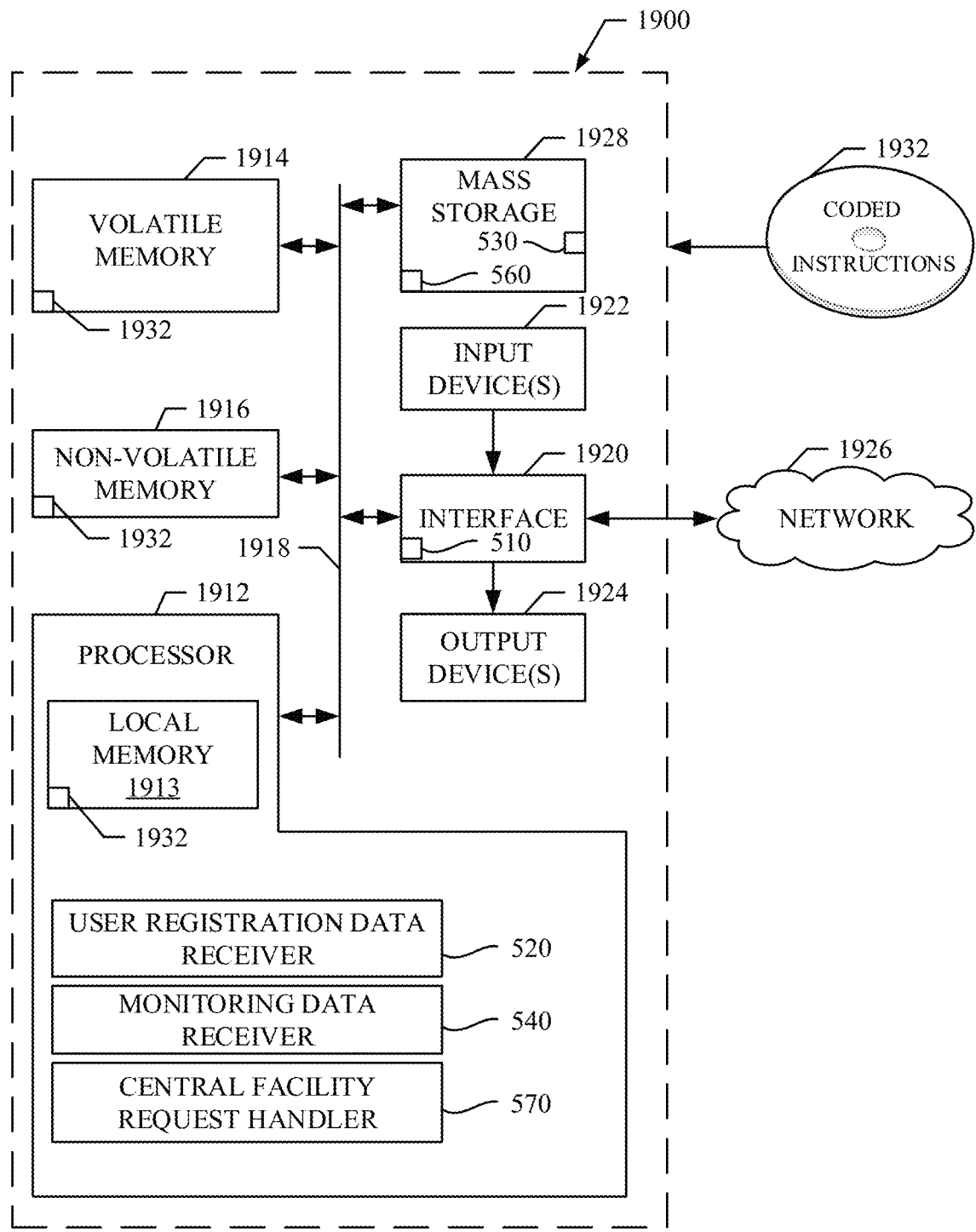
FIG. 19 is a block diagram of an example processor platform capable of executing the instructions of FIGS. 11 and/or 15 to implement the example database proprietor of FIGS. 1 and/or 5.

FIG. 19 is a block diagram of an example processor platform 1900 capable of executing the instructions of FIGS. 6, 11, and/or 15 to implement the example database proprietor 180 of FIGS. 1 and/or 5. The processor platform 1900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors or controllers from any desired family or manufacturer.

The processor 1912 of the illustrated example includes a local memory 1913 (e.g., a cache) and executes instructions to implement the example user registration data receiver 520, the example monitoring data receiver 540, and the example central facility request handler 570. The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), and/or a PCI express interface.

In the illustrated example, one or more input devices 1922 are connected to the interface circuit 1920. The input device(s) 1922 permit(s) a user to enter data and commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1920 of the illustrated example, thus, typically includes a graphics driver card, a graphics driver chip or a graphics driver processor.

The interface circuit 1920 of the illustrated example also includes a communication device such as a transmitter, a receiver, a transceiver, a modem and/or network interface card to facilitate exchange of data with external machines (e.g., computing devices of any kind) via a network 1926 (e.g., an Ethernet connection, a digital subscriber line (DSL), a telephone line, coaxial cable, a cellular telephone system, etc.). In some examples, the example interface circuit 1920 implements the example network communicator 510.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, RAID systems, and digital versatile disk (DVD) drives. The example mass storage devices 1928 may implement the example demographic information database 530 and/or the example metadata database 560.

The coded instructions 1932 of FIGS. 6, 11, and/or 15 may be stored in the mass storage device 1928, in the volatile memory 1914, in the non-volatile memory 1916, and/or on a removable tangible computer readable storage medium such as a CD or DVD.

From the foregoing, it will be appreciated that the above disclosed methods, apparatus and articles of manufacture enable Digital TV ratings for mobile measurement using a census-based approach (e.g., using a demographic report from a database proprietor). In examples disclosed herein, the use of a segment code in connection with a media identifier enables minute level demographics to be reported upon. Moreover, the use of the segment code, which aggregates multiple media presentation segments within a period of media presentation into a single monitoring message, reduces an amount of network communications to be transmitted by a media device. As a result, bandwidth efficiency is improved, as the amount of monitoring messages is reduced. Furthermore, because fewer monitoring messages are used, the monitoring information contained therein, when stored at a central facility and/or a database proprietor, requires less storage space, as multiple monitoring messages (e.g., five monitoring messages corresponding to five minutes of media presentation) are condensed into fewer monitoring messages (e.g., one monitoring message corresponding to the five minute period of media presentation). Such reduction in the number of monitoring messages results in more efficient storage of data at the central facility 170 and/or database proprietor 180, 182.

It is noted that this patent claims priority from Indian Patent Application Serial Number 2733/DEL/2015, which was filed on Sep. 1, 2015, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system to monitor a media presentation, the system comprising:
   a media monitor to gather a media identifier from presented media and request a time shifted viewing code in response to detecting the media presentation, the time shifted viewing code to be included in a monitoring message identifying the media presentation; and
   a server to:
      determine a difference between a time of receipt of the request for the time shifted viewing code and a timestamp of the media identifier;
      calculate a time shifted viewing code based on the difference;
      set the time shifted viewing code to a first value representative of live viewing in response to determining that the difference is less than a first threshold amount of time and corresponds to live viewing;
      set the time shifted viewing code to a second value representative of same day non-live viewing in response to determining that the difference is not less than a second threshold amount of time and corresponds to a same day, wherein the second threshold is about twenty seven hours; and
      provide the time shifted viewing code to the media monitor.

2. The system of claim 1, further including a central facility including the server and a metadata receiver to receive the monitoring message identifying the media presentation.

3. The system of claim 1, wherein the server is to set the time shifted viewing code to a third value representative of an unknown time shifted viewing state in response to determining that the timestamp of the media identifier does not represent a time of distribution of the media.

4. A non-transitory machine-readable storage medium comprising instructions which, when executed, cause a machine to at least:
   in response to receipt of a media identifier, extract a timestamp from the media identifier;
   determine a time of receipt of the media identifier;
   determine a difference between the time of receipt of the media identifier and the timestamp from the media identifier;
   determine a first value for a time shifted viewing code when the difference is not less than a first threshold and the time of receipt of the media identifier and the timestamp from the media identifier correspond to a same day, wherein the first threshold is about two minutes;
   determine a second value for the time shifted viewing code when the difference is less than the first threshold, the second value for the time shifted viewing code representing live viewing; and
   transmit the time shifted viewing code to a media monitor that transmitted the media identifier, the time shifted viewing code to be reported when the media monitor reports monitoring information.

5. The non-transitory machine-readable storage medium of claim 4, wherein the instructions, when executed, cause the machine to determine a type of station identifier included in the media identifier.

6. The non-transitory machine-readable storage medium of claim 4, wherein the instructions, when executed, cause the machine to calculate the time shifted viewing code by determining a third value for the time shifted viewing code different from the first and second values when the difference is less than a second threshold and the time of receipt of the media identifier and the timestamp from the media identifier do not correspond to the same day.

7. The non-transitory machine-readable storage medium of claim 6, wherein the second threshold is about twenty seven hours.

8. The non-transitory machine-readable storage medium of claim 4, wherein the instructions, when executed, cause the machine to set the time shifted viewing code to a fourth value representative of an unknown time shifted viewing state in response to determining that a timestamp encoding utilized by the media identifier indicates that the timestamp included in the media identifier does not represent a time of distribution of the media.

9. A method of monitoring a media presentation, the method comprising:
   in response to receipt of a media identifier, extracting, by executing an instruction with a processor, a timestamp from the media identifier;
   determining a time of receipt of the media identifier;
   determining, by executing an instruction with the processor, a difference between the time of receipt of the media identifier and the timestamp from the media identifier;
   calculating, by executing an instruction with the processor, a time shifted viewing code based on the difference by:
      determining a first value for the time shifted viewing code representing same day non-live viewing when (1) the difference is not less than a first threshold and (2) the time of receipt of the media identifier and the timestamp from the media identifier correspond to a same day, wherein the first threshold is about two minutes; and determining a second value for the time shifted viewing code when the difference is less than the first threshold, the second value for the time shifted viewing code representing live viewing; and transmitting the time shifted viewing code to a media monitor that transmitted the media identifier, the time shifted viewing code to be reported when the media monitor reports monitoring information.

10. The method of claim 9, further including determining a type of station identifier included in the media identifier.

11. The method of claim 9, wherein the calculating of the time shifted viewing code includes determining a third value for the time shifted viewing code different from the first and second values when the difference is less than a second threshold and the time of receipt of the media identifier and the timestamp from the media identifier do not correspond to the same day.

12. The method of claim 11, wherein the second threshold is about twenty seven hours.

13. The method of claim 9, further including setting the time shifted viewing code to a fourth value representative of an unknown time shifted viewing state in response to determining that a timestamp encoding utilized by the media identifier indicates that the timestamp included in the media identifier does not represent a time of distribution of the media.

14. A system to monitor a media presentation, the system comprising:

a media monitor to gather a media identifier from presented media and request a time shifted viewing code in response to detecting the media presentation, the time shifted viewing code to be included in a monitoring message identifying the media presentation; and a server to:

determine a difference between a time of receipt of the request for the time shifted viewing code and a timestamp of the media identifier;

calculate a time shifted viewing code based on the difference;

set the time shifted viewing code to a first value representative of live viewing in response to determining that the difference is less than a threshold amount of time and corresponds to live viewing, wherein the threshold is about two minutes;

set the time shifted viewing code to a second value representative of an unknown time shifted viewing state in response to determining that a timestamp encoding utilized by the media identifier indicates that the timestamp included in the media identifier does not represent a time of distribution of the media; and provide the time shifted viewing code to the media monitor.

15. The system of claim 14, further including a central facility including the server and a metadata receiver to receive the monitoring message identifying the media presentation.

16. A non-transitory machine-readable storage medium comprising instructions which, when executed, cause a machine to at least:

in response to receipt of a media identifier, extract a timestamp from the media identifier;

determine a time of receipt of the media identifier;

determine a difference between the time of receipt of the media identifier and the timestamp from the media identifier;

set a time shifted viewing code to a first value representative of live viewing when the difference is less than a first threshold, wherein the first threshold is about two minutes;

set a time shifted viewing code set to a second value representative of an unknown time shifted viewing state in response to determining that a timestamp encoding utilized by the media identifier indicates that the timestamp included in the media identifier does not represent a time of distribution of the media; and transmit the time shifted viewing code to a media monitor that transmitted the media identifier, the time shifted viewing code to be reported when the media monitor reports monitoring information.

17. The non-transitory machine-readable storage medium of claim 16, wherein the instructions, when executed, cause the machine to determine a type of station identifier included in the media identifier.

18. The non-transitory machine-readable storage medium of claim 16, wherein the instructions, when executed, cause the machine to calculate the time shifted viewing code by determining a second value for the time shifted viewing code when the difference is not less than the first threshold, and the time of receipt of the media identifier and the timestamp from the media identifier correspond to a same day.

19. The non-transitory machine-readable storage medium of claim 18, wherein the instructions, when executed, cause the machine to calculate the time shifted viewing code by determining a third value for the time shifted viewing code different from the first and second values when the difference is less than a second threshold and the time of receipt of the media identifier and the timestamp from the media identifier do not correspond to the same day.

20. The non-transitory machine-readable storage medium of claim 19, wherein the second threshold is about twenty seven hours.

21. A method of monitoring a media presentation, the method comprising:

in response to receipt of a media identifier, extracting, by executing an instruction with a processor, a timestamp from the media identifier;

determining a time of receipt of the media identifier;

determining, by executing an instruction with the processor, a difference between the time of receipt of the media identifier and the timestamp from the media identifier;

setting, by executing an instruction with the processor, a time shifted viewing code to a first value representative of live viewing when the difference is less than a first threshold, wherein the first threshold is about two minutes;

setting, by executing an instruction with the processor, the time shifted viewing code to a second value representative of an unknown time shifted viewing state in response to determining that a timestamp encoding utilized by the media identifier indicates that the timestamp included in the media identifier does not represent a time of distribution of the media; and transmitting the time shifted viewing code to a media monitor that transmitted the media identifier, the time shifted viewing code to be reported when the media monitor reports monitoring information.

22. The method of claim 21, further including determining a type of station identifier included in the media identifier.

23. The method of claim 21, wherein the setting of the time shifted viewing code includes determining a second value for the time shifted viewing code when the difference is not less than the first threshold, and the time of receipt of the media identifier and the timestamp from the media identifier correspond to a same day.

24. The method of claim 23, wherein the setting of the time shifted viewing code includes determining a third value for the time shifted viewing code different from the first and second values when the difference is less than a second threshold and the time of receipt of the media identifier and the timestamp from the media identifier do not correspond to the same day.

25. The method of claim 24, wherein the second threshold is about twenty seven hours.

26. A non-transitory machine-readable storage medium comprising instructions which, when executed, cause a machine to at least:
- in response to receipt of a media identifier, extract a timestamp from the media identifier;
- determine a time of receipt of the media identifier;
- determine a difference between the time of receipt of the media identifier and the timestamp from the media identifier;
- determine a first value for a time shifted viewing code when the difference is not less than a first threshold and the time of receipt of the media identifier and the timestamp from the media identifier correspond to a same day;
- determine a second value for the time shifted viewing code when the difference is less than the first threshold, the second value for the time shifted viewing code representing live viewing;
- determine a third value for the time shifted viewing code different from the first and second values when the difference is less than a second threshold and the time of receipt of the media identifier and the timestamp from the media identifier do not correspond to the same day, wherein the second threshold is about twenty seven hours; and
- transmit the time shifted viewing code to a media monitor that transmitted the media identifier, the time shifted viewing code to be reported when the media monitor reports monitoring information.

27. The non-transitory machine-readable storage medium of claim 26, wherein the first threshold is about two minutes.

28. The non-transitory machine-readable storage medium of claim 26, wherein the instructions, when executed, cause the machine to determine a type of station identifier included in the media identifier.

29. The non-transitory machine-readable storage medium of claim 26, wherein the instructions, when executed, cause the machine to set the time shifted viewing code to a fourth value representative of an unknown time shifted viewing state in response to determining that a timestamp encoding utilized by the media identifier indicates that the timestamp included in the media identifier does not represent a time of distribution of the media.

30. A method of monitoring a media presentation, the method comprising:
- in response to receipt of a media identifier, extracting, by executing an instruction with a processor, a timestamp from the media identifier;
- determining a time of receipt of the media identifier;
- determining, by executing an instruction with the processor, a difference between the time of receipt of the media identifier and the timestamp from the media identifier;
- calculating, by executing an instruction with the processor, a time shifted viewing code based on the difference by:
  - determining a first value for the time shifted viewing code representing same day non-live viewing when (1) the difference is not less than a first threshold and (2) the time of receipt of the media identifier and the timestamp from the media identifier correspond to a same day; and
  - determining a second value for the time shifted viewing code when the difference is less than the first threshold, the second value for the time shifted viewing code representing live viewing;
  - determining a third value for the time shifted viewing code different from the first and second values when the difference is less than a second threshold and the time of receipt of the media identifier and the timestamp from the media identifier do not correspond to the same day, wherein the second threshold is about twenty seven hours; and
- transmitting the time shifted viewing code to a media monitor that transmitted the media identifier, the time shifted viewing code to be reported when the media monitor reports monitoring information.

31. The method of claim 30, wherein the first threshold is about two minutes.

32. The method of claim 30, further including determining a type of station identifier included in the media identifier.

33. The method of claim 30, further including setting the time shifted viewing code to a fourth value representative of an unknown time shifted viewing state in response to determining that a timestamp encoding utilized by the media identifier indicates that the timestamp included in the media identifier does not represent a time of distribution of the media.

* * * * *